(12) United States Patent
Goto

(10) Patent No.: US 10,244,015 B2
(45) Date of Patent: Mar. 26, 2019

(54) SYSTEM TO CONTROL OUTPUT OF IMAGES TO MULTIPLE DEVICES IN A NETWORK

(71) Applicant: Takashi Goto, Kanagawa (JP)

(72) Inventor: Takashi Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/753,019

(22) PCT Filed: Aug. 12, 2016

(86) PCT No.: PCT/JP2016/003738
§ 371 (c)(1),
(2) Date: Feb. 15, 2018

(87) PCT Pub. No.: WO2017/029805
PCT Pub. Date: Feb. 23, 2017

(65) Prior Publication Data
US 2018/0241786 A1    Aug. 23, 2018

(30) Foreign Application Priority Data

Aug. 18, 2015    (JP) ................. 2015-161432

(51) Int. Cl.
*H04L 29/06*    (2006.01)
*G06F 3/14*    (2006.01)
(Continued)

(52) U.S. Cl.
CPC ........ *H04L 65/4046* (2013.01); *G06F 3/1423* (2013.01); *G06F 3/1454* (2013.01);
(Continued)

(58) Field of Classification Search
None
See application file for complete search history.

(56) References Cited

U.S. PATENT DOCUMENTS 8,201,212 B2    6/2012 Goto et al.
2006/0262346 A1    11/2006 Goto
(Continued)

FOREIGN PATENT DOCUMENTS

JP    2004-336597 A    11/2004
JP    2008-294789    12/2008
(Continued)

OTHER PUBLICATIONS

International Search Report and Written Opinion dated Oct. 4, 2016, in PCT/JP2016/003738 flied Aug. 12, 2016.
(Continued)

*Primary Examiner* — Andrew H Lam
(74) *Attorney, Agent, or Firm* — Oblon, McClelland, Maier & Neustadt, L.L.P.

(57) ABSTRACT

A system including a first output apparatus and a second output apparatus that are connected to an information processing apparatus via a network and includes a job generating unit that generates a plurality of jobs that instruct the execution of processing to exchange a first age output to the first output apparatus for a second image output to the second output apparatus based on an image exchange instruction received on a screen that receives user operations and a job execution instructing unit that instructs the first output apparatus and the second output apparatus to execute the processing to exchange the first image for the second image based on the jobs.

12 Claims, 14 Drawing Sheets

(51) Int. Cl.
*G06F 13/00* (2006.01)
*H04N 1/00* (2006.01)
*H04N 1/42* (2006.01)

(52) U.S. Cl.
CPC ............... *G06F 13/00* (2013.01); *H04N 1/00* (2013.01); *H04N 1/42* (2013.01); *G06F 3/1438* (2013.01)

(56) References Cited

U.S. PATENT DOCUMENTS

| | | | |
|---|---|---|---|
| 2007/0280219 A1 | 12/2007 | Shimizu et al. | |
| 2009/0051622 A1* | 2/2009 | Yun | G06F 3/1431 345/2.1 |
| 2010/0149206 A1* | 6/2010 | Shigehisa | G06F 3/04883 345/595 |

FOREIGN PATENT DOCUMENTS

| | | |
|---|---|---|
| JP | 2010-146086 | 7/2010 |
| JP | 2011-232603 A | 11/2011 |
| JP | 2012-106211 A | 6/2012 |
| JP | 2013-232124 | 11/2013 |
| JP | 2014-236336 | 12/2014 |
| JP | 2014-238667 | 12/2014 |

OTHER PUBLICATIONS

Partial Supplementary European Search Report dated Aug. 3, 2018 in Patent Application No. 16836799.3.

* cited by examiner

[Fig. 1]
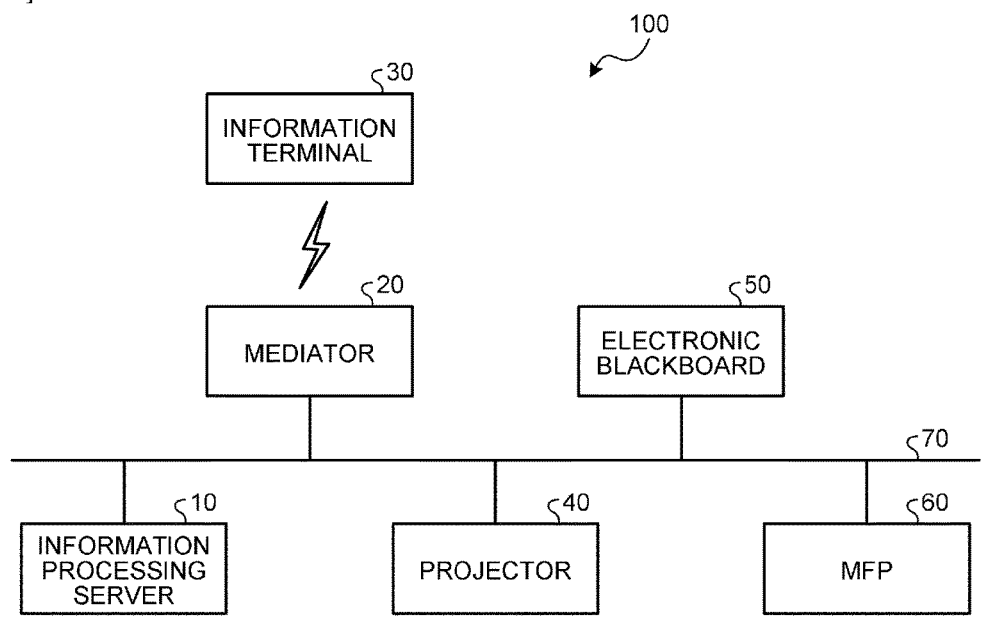
[Fig. 2]
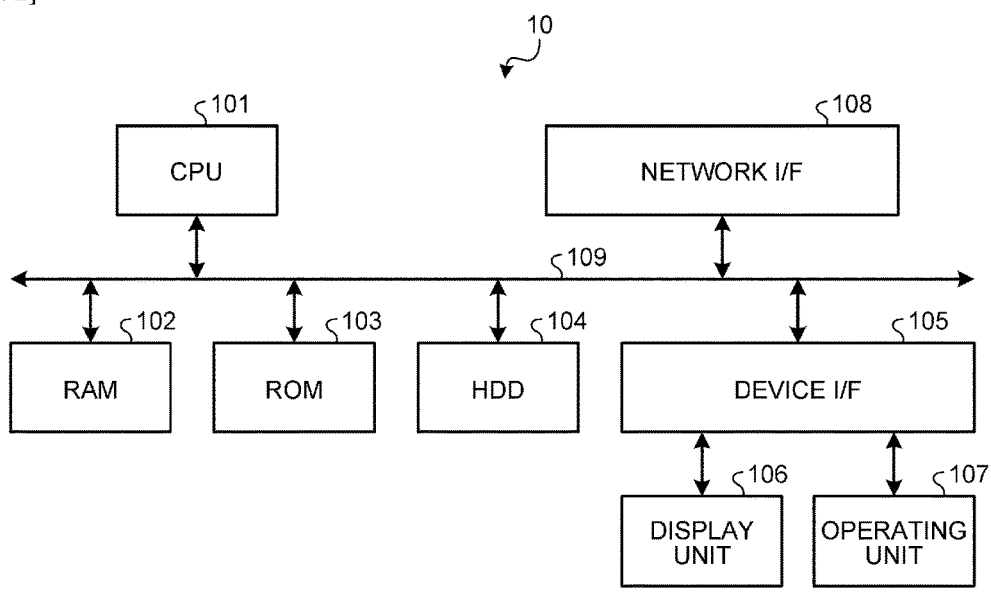

[Fig. 3]

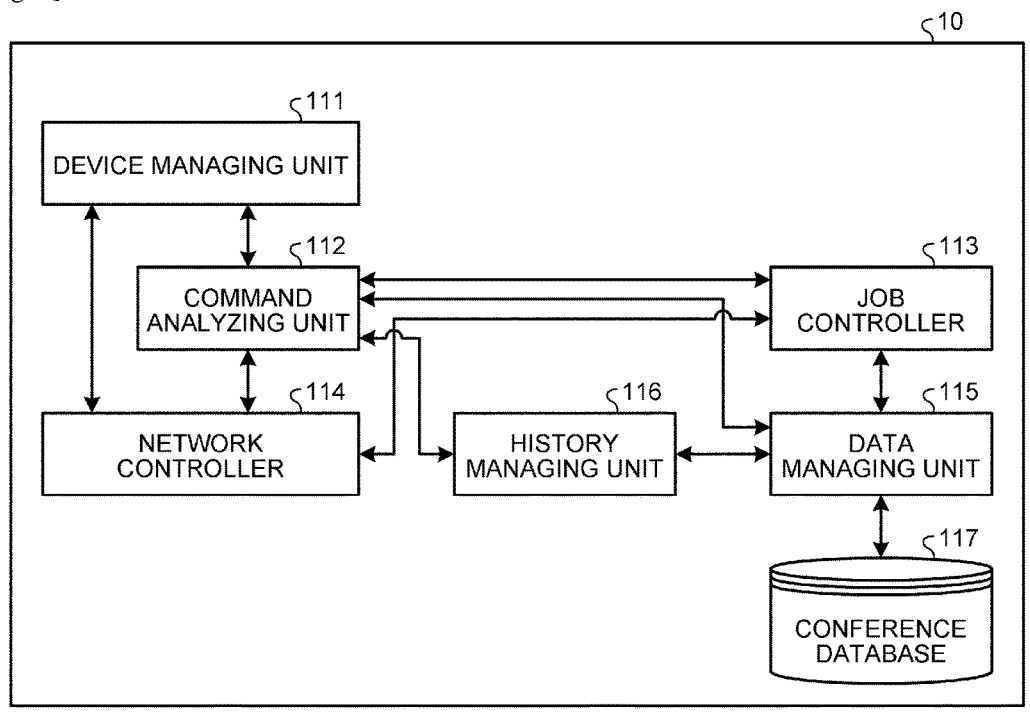

[Fig. 4]

| NETWORK-CONNECTED DEVICE | DEVICE ID | PERMISSION TO CONNECT | CONNECTION STATE |
|---|---|---|---|
| PJS-A | xxxxxxx | PERMISSION | BEING CONNECTED |
| PJS-B | yyyyyy | REJECTION | - |
| IWB-A | zzzzzzz | PERMISSION | BEING CONNECTED |
| ⋮ | ⋮ | ⋮ | ⋮ |

[Fig. 5]

| IMAGE FILE NAME | USER NAME | PROCESSING INFORMATION | DATE AND TIME | PROCESSING STATE |
|---|---|---|---|---|
| ABC.jpeg | TANAKA | PJS PROJECTION | 2015/06/27 12:12:00 | UNUSED |
| DEF.pdf | SATO | IWB PROJECTION | 2015/06/28 14:11:11 | BEING PROJECTED |
| GHK.jpeg | SUZUKI | PJS PROJECTION | 2015/06/28 14:11:14 | BEING PROJECTED |
| ⋮ | ⋮ | ⋮ | ⋮ | ⋮ |

[Fig. 6]
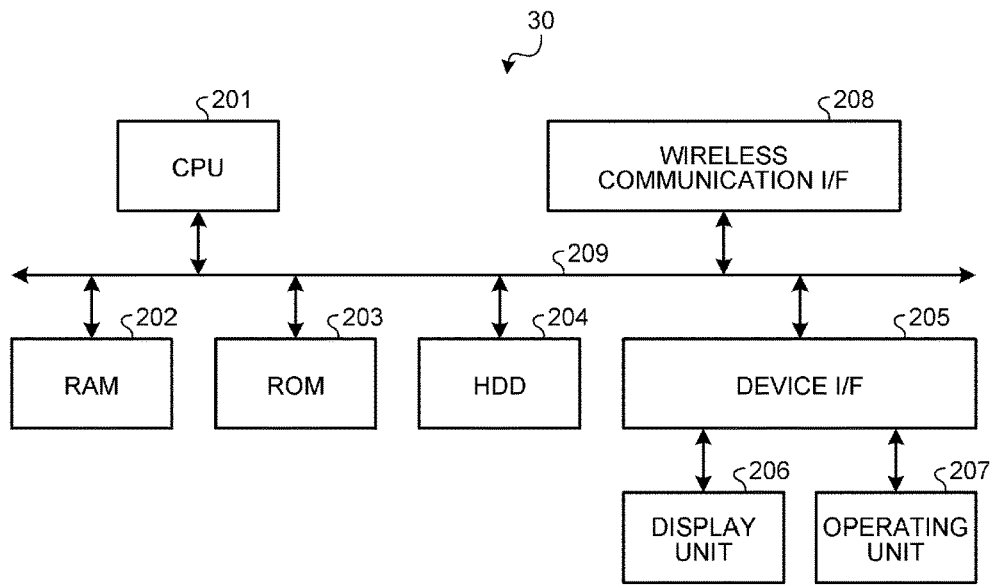
[Fig. 7]
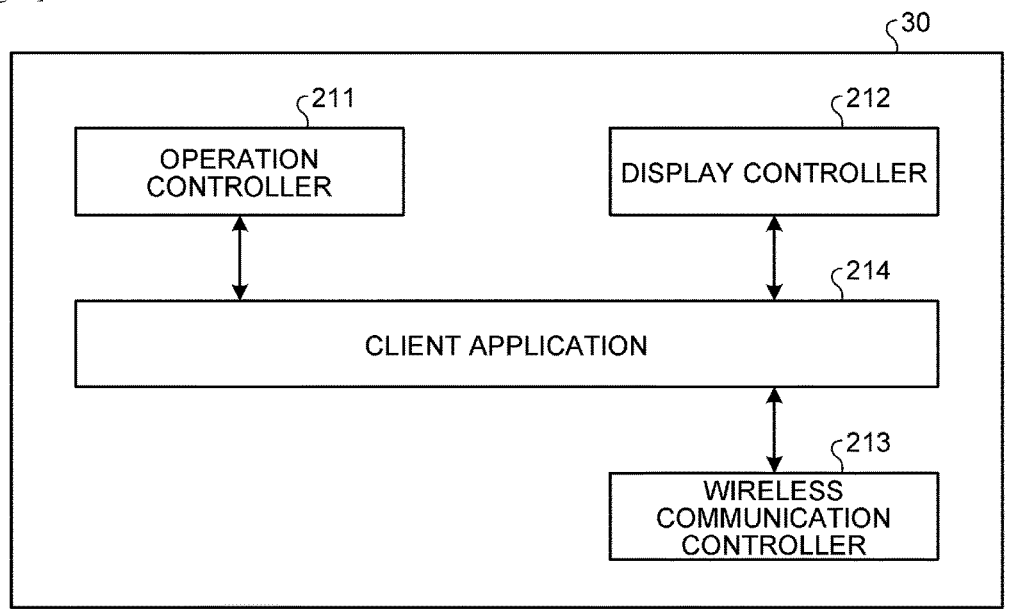
[Fig. 8]
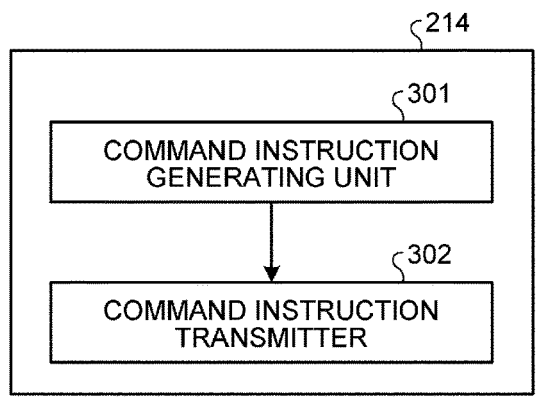

[Fig. 9]
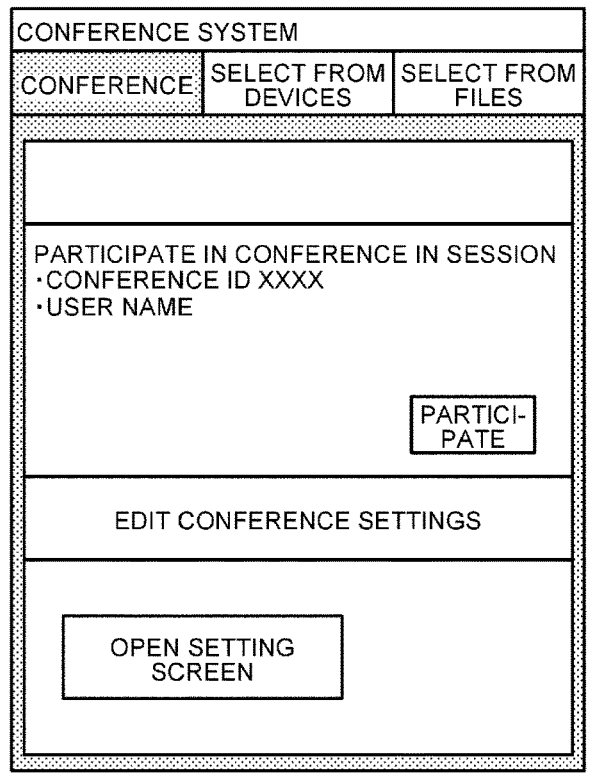
[Fig. 10]
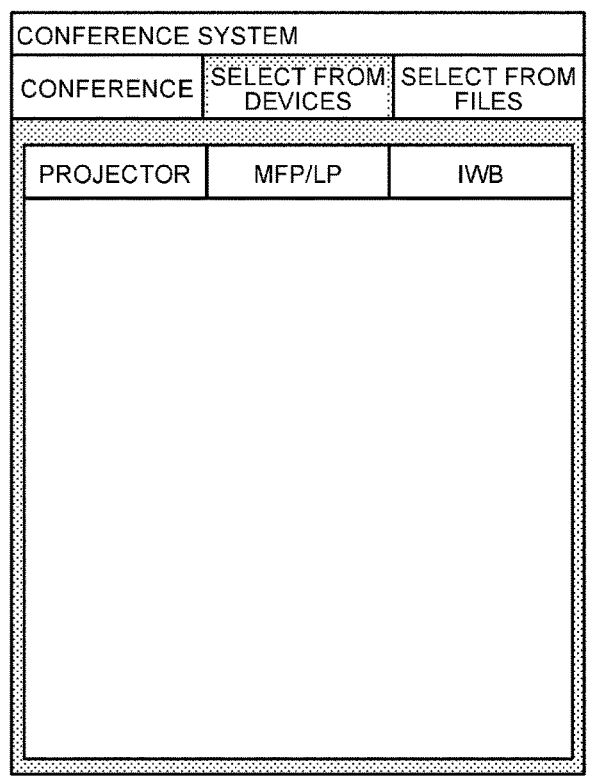

[Fig. 11]
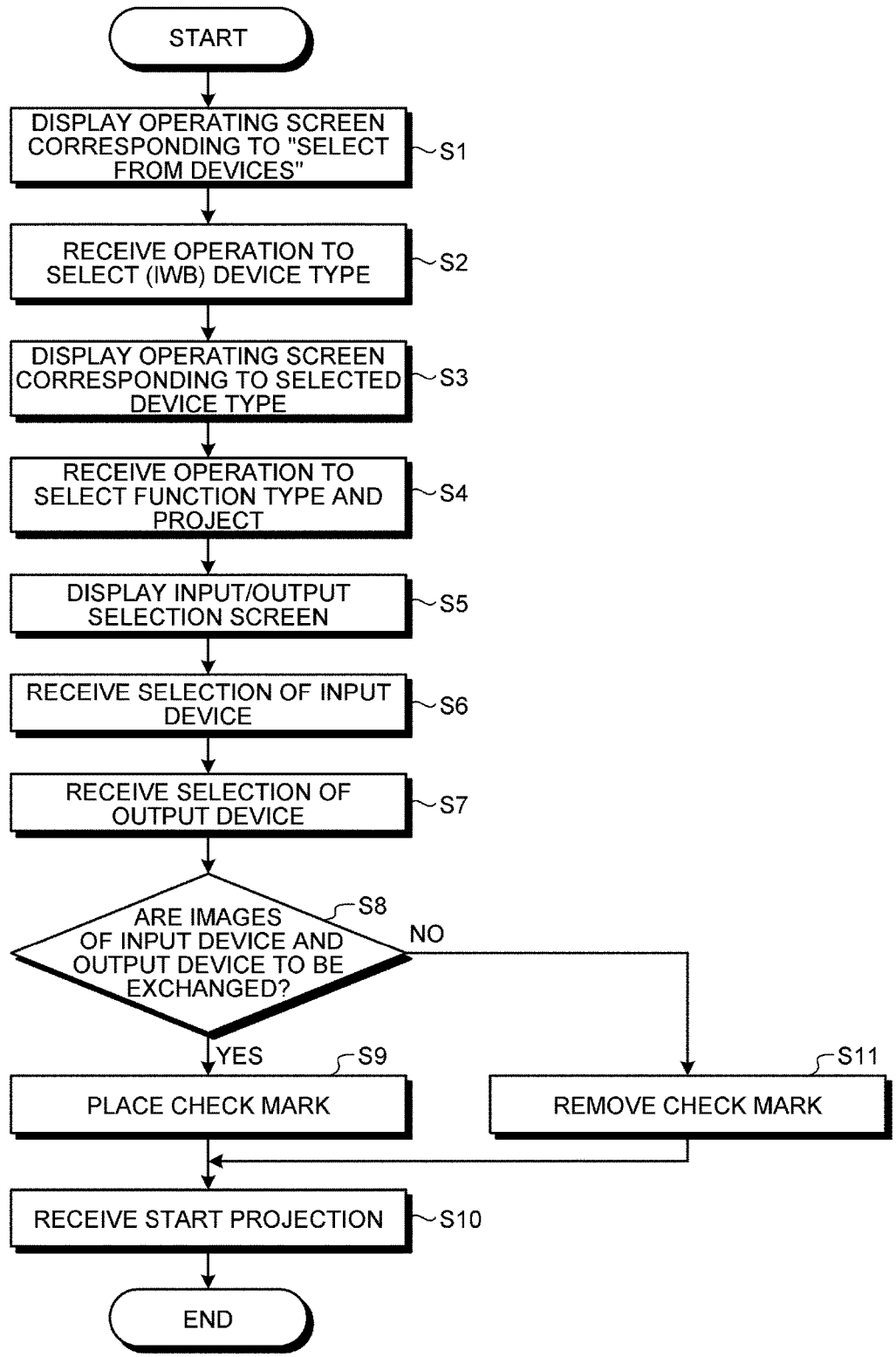

[Fig. 12]
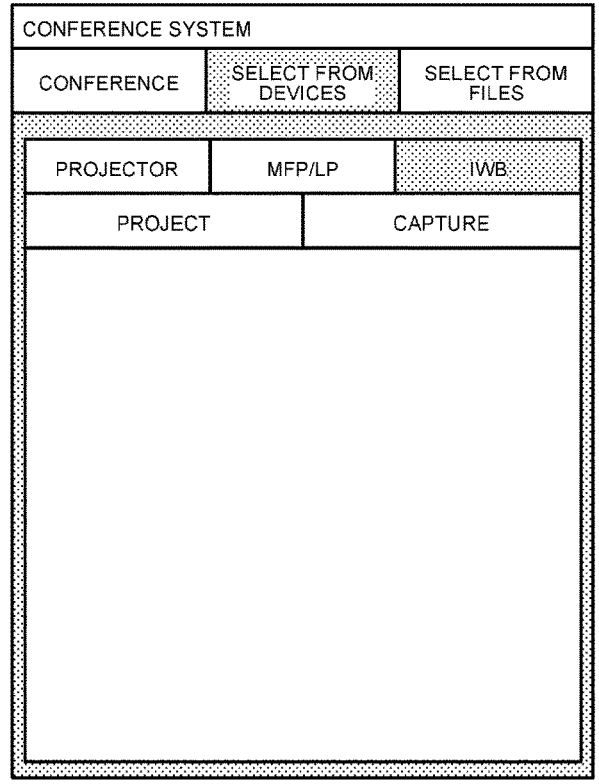
[Fig. 13]
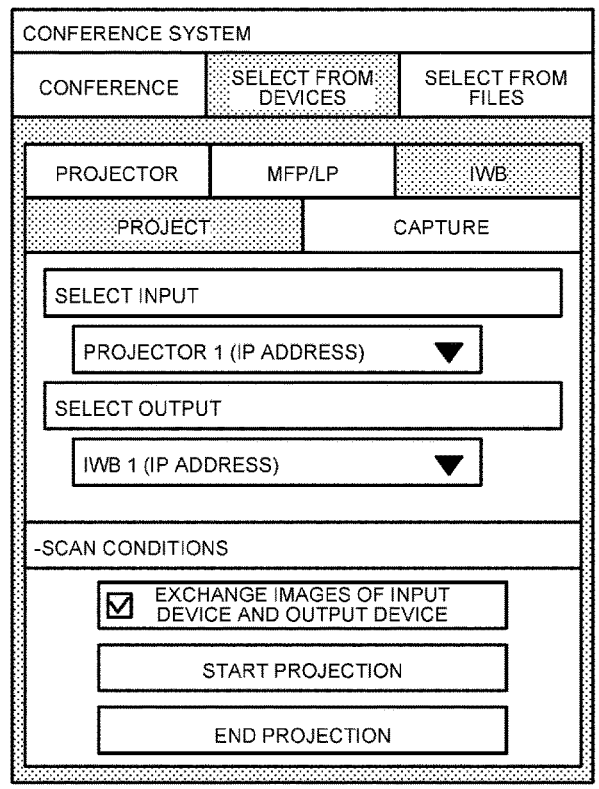

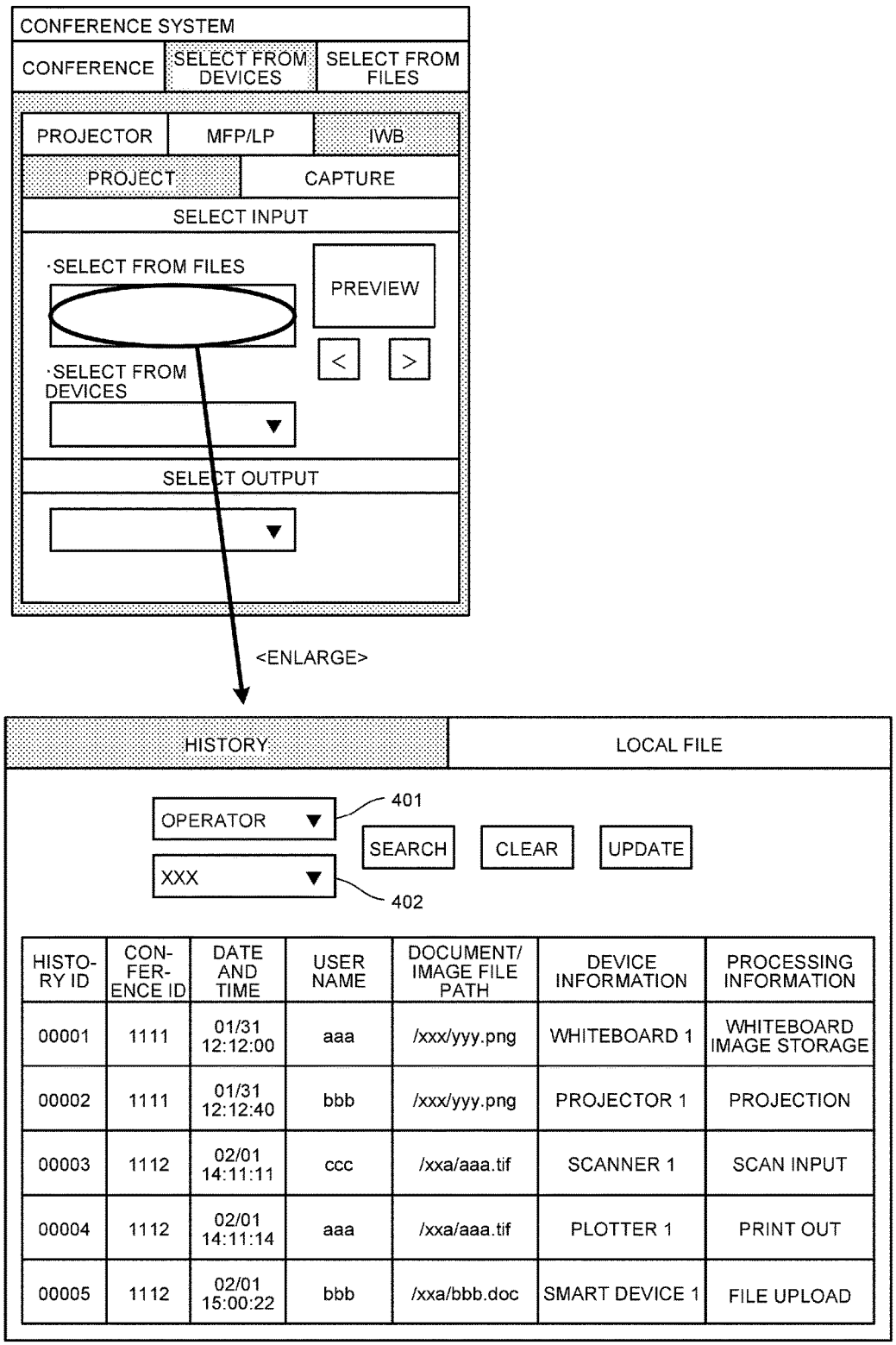
[Fig. 14]

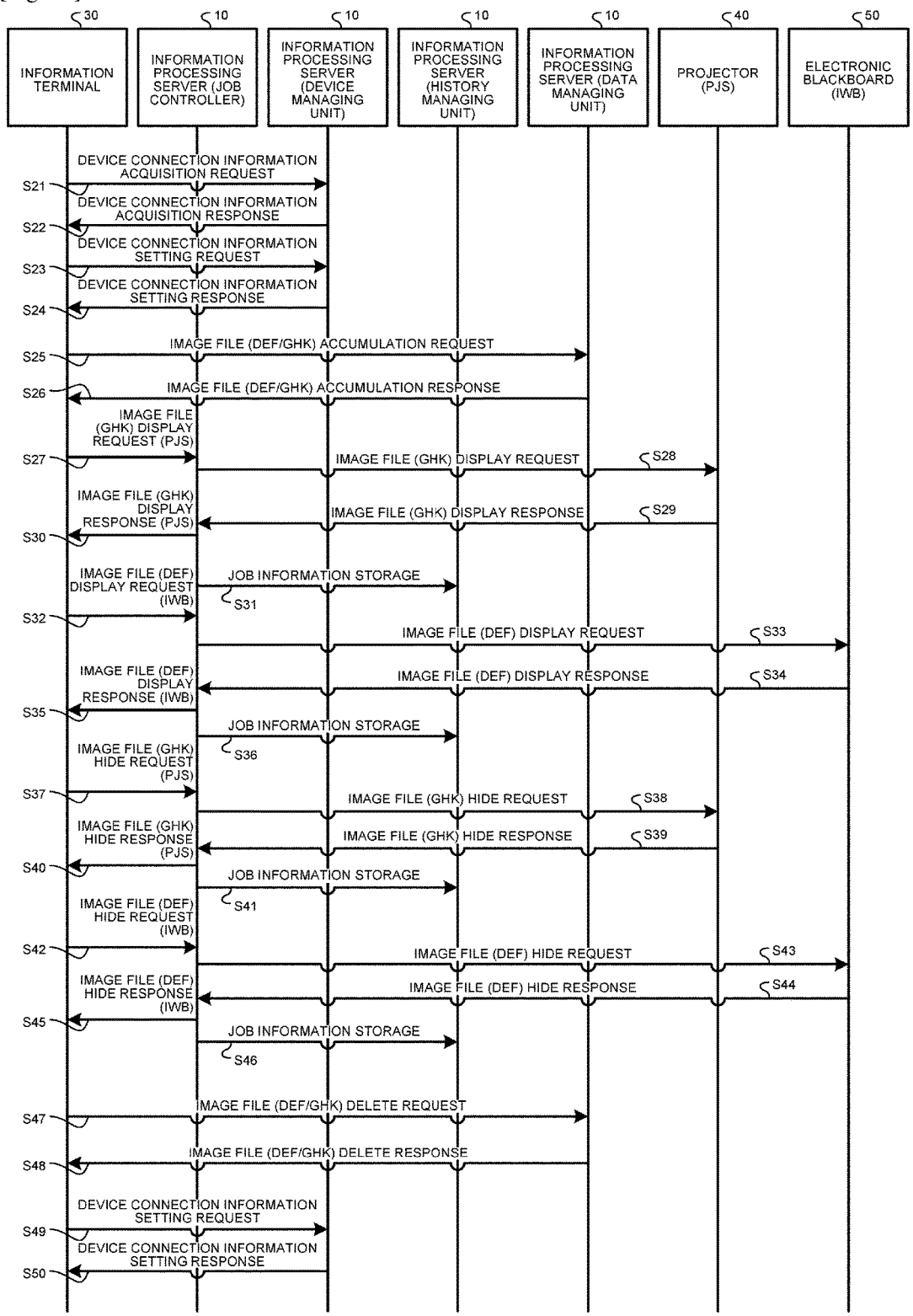

[Fig. 16]
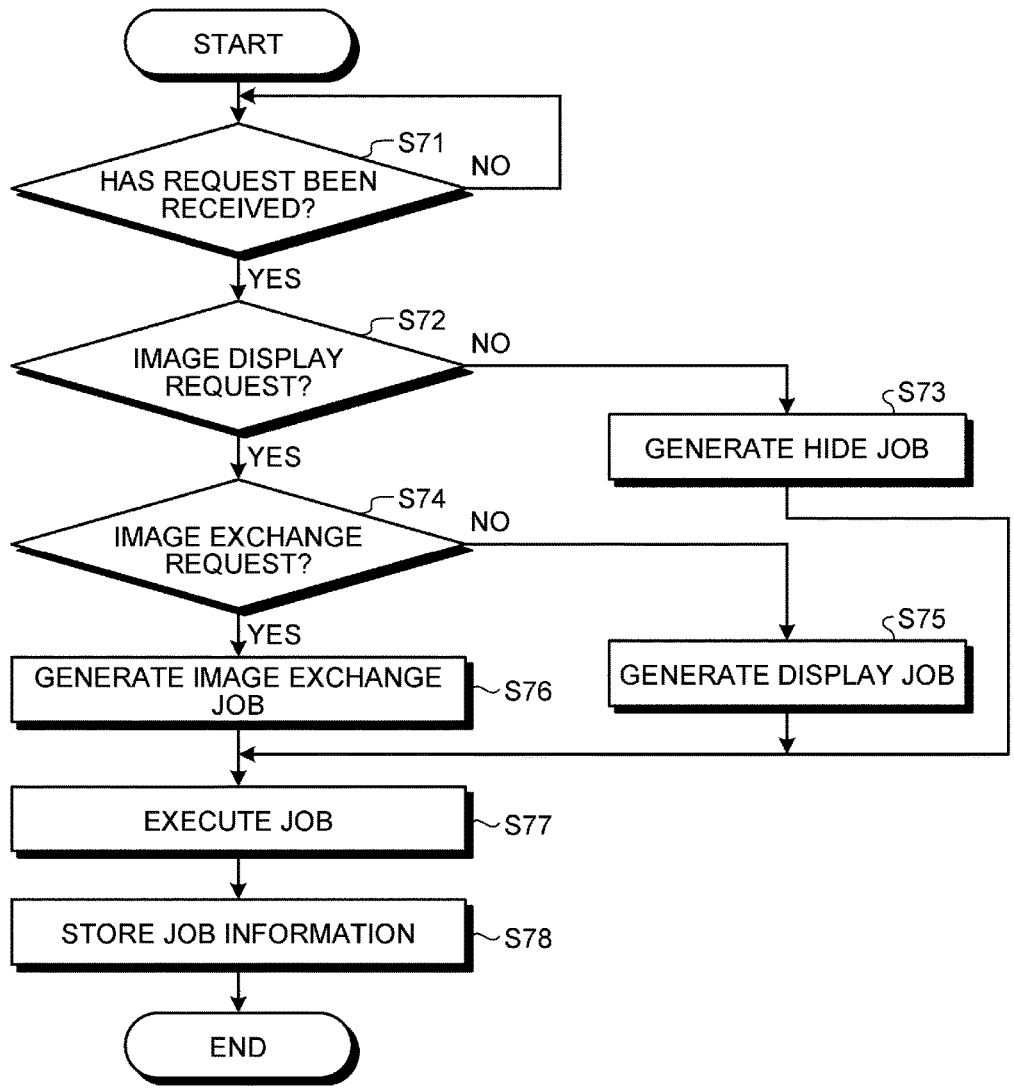

[Fig. 17]
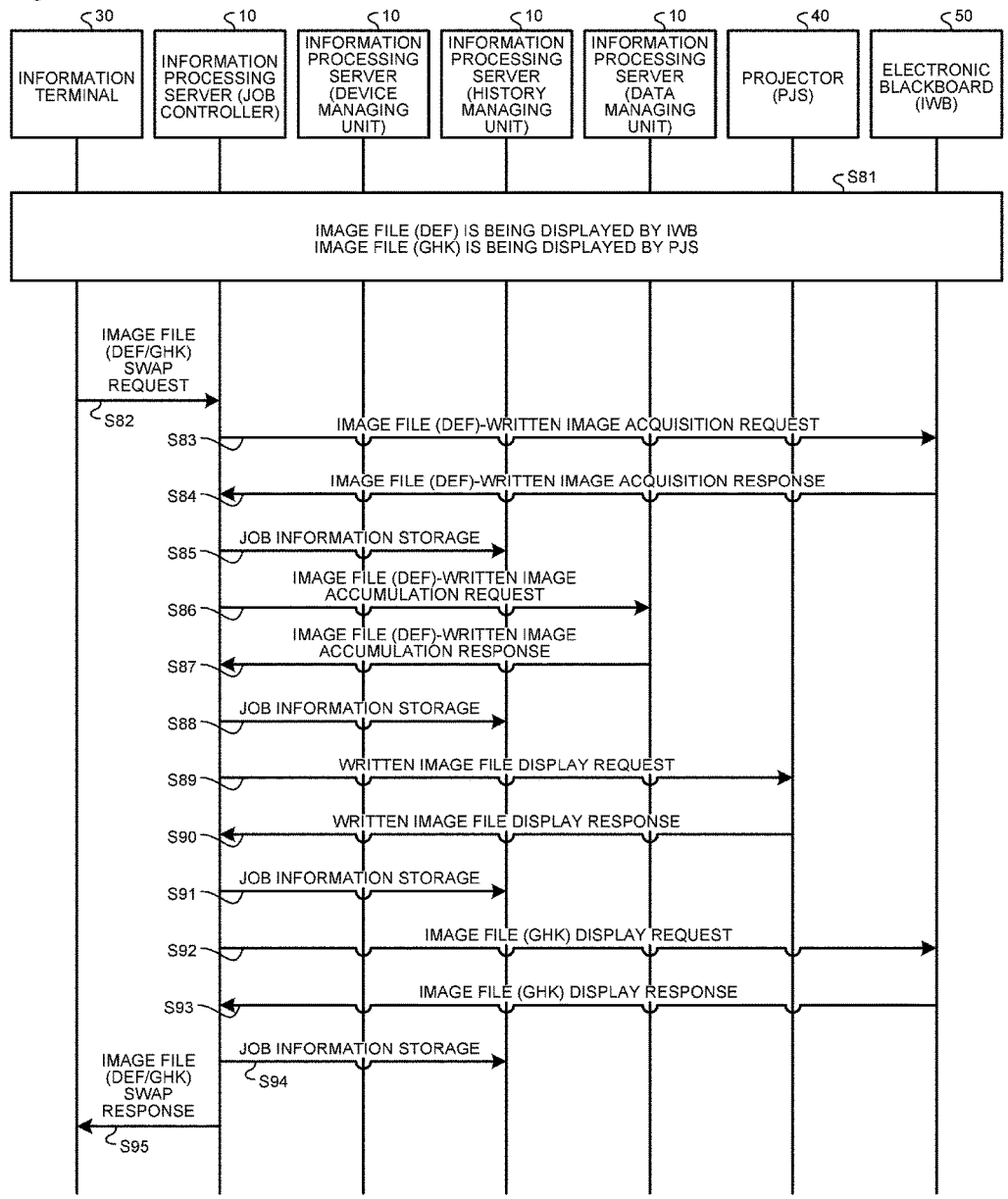

[Fig. 18]

| IMAGE FILE NAME | USER NAME | PROCESSING INFORMATION | DATE AND TIME | PROCESSING STATE |
|---|---|---|---|---|
| ABC.jpeg | TANAKA | PJS PROJECTION | 2015/06/27 12:12:00 | UNUSED |
| DEF.pdf | SATO | IWB PROJECTION | 2015/06/28 14:11:11 | UNUSED |
| GHK.jpeg | SUZUKI | PJS PROJECTION | 2015/06/28 14:11:14 | UNUSED |
| DEF-WRITTEN.pdf | TAKAHASHI | PJS PROJECTION | 2015/06/28 14:15:00 | BEING PROJECTED |
| GHK.jpeg | TAKAHASHI | IWB PROJECTION | 2015/06/28 14:15:05 | BEING PROJECTED |
| ⋮ | ⋮ | ⋮ | ⋮ | ⋮ |

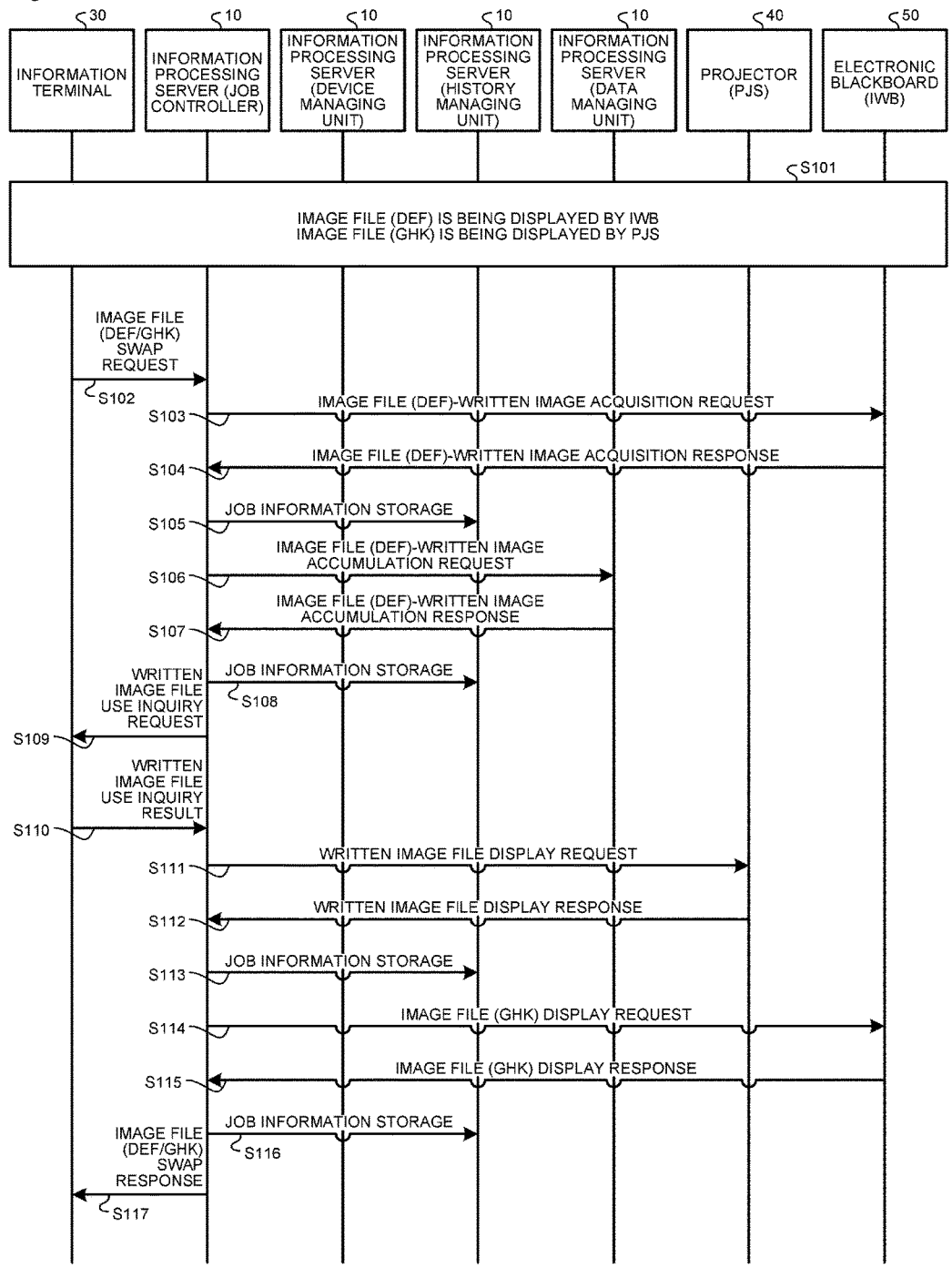

[Fig. 20]
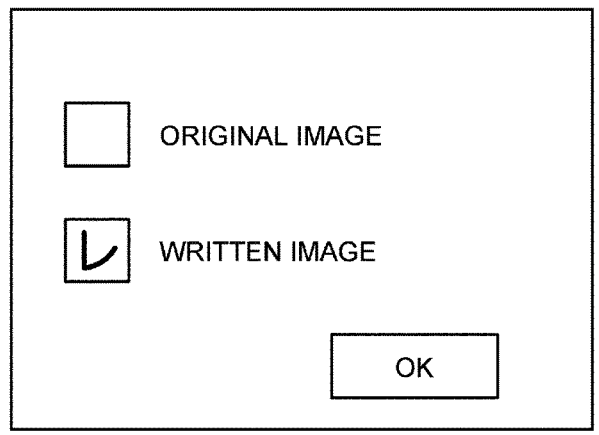
[Fig. 21]
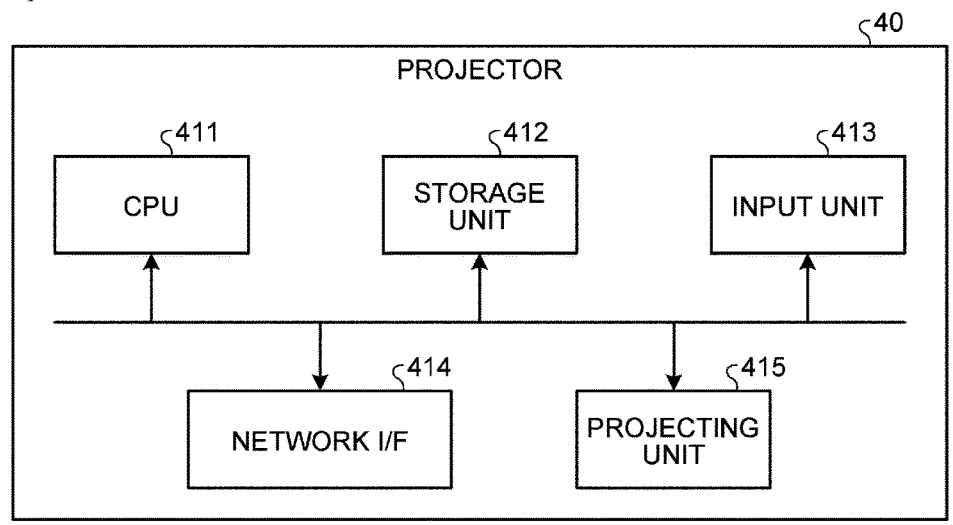

[Fig. 22]
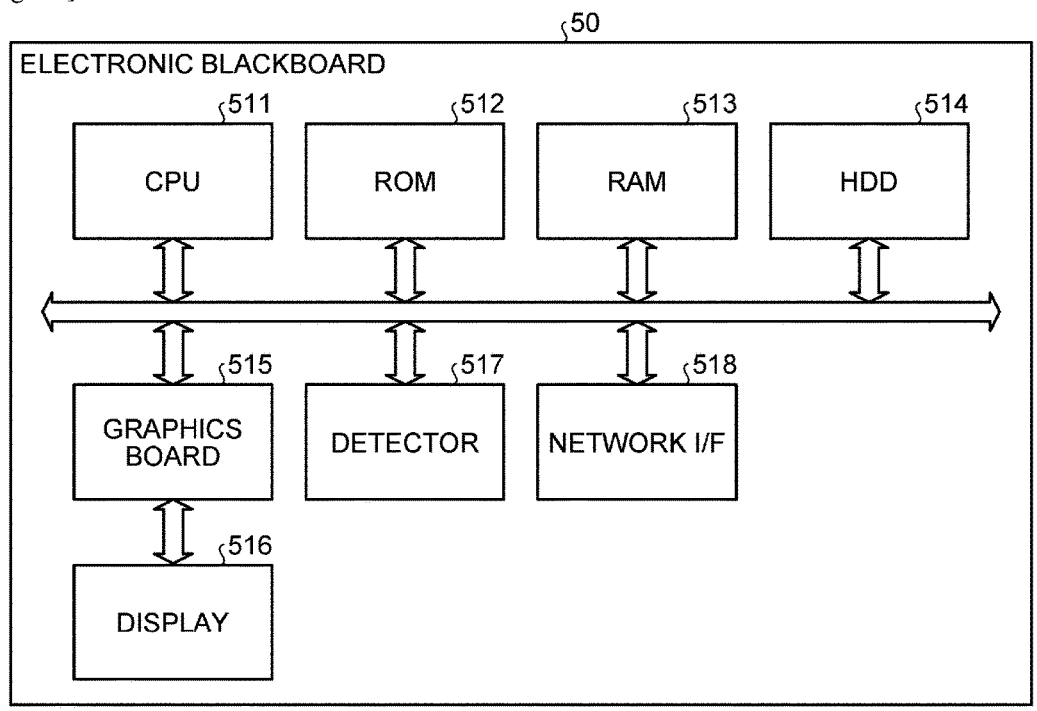
[Fig. 23]
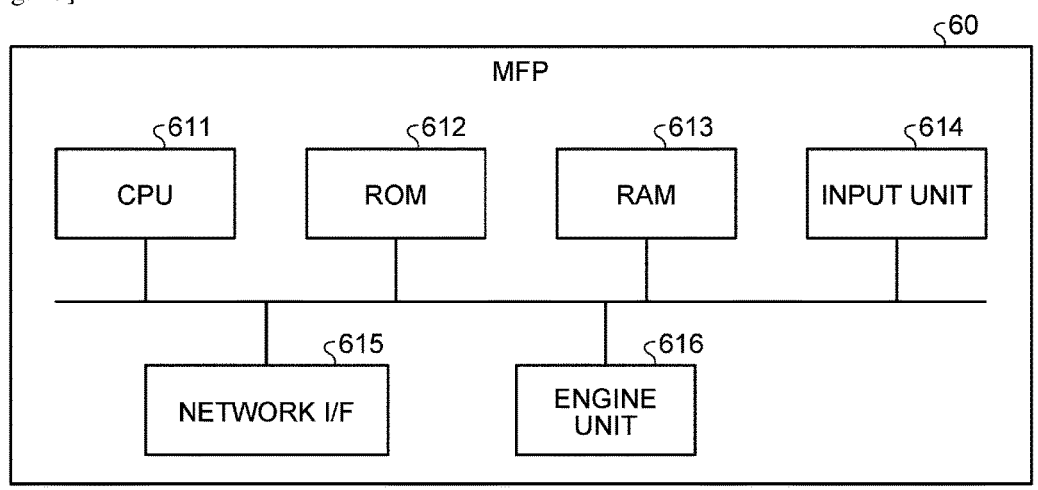

SYSTEM TO CONTROL OUTPUT OF IMAGES TO MULTIPLE DEVICES IN A NETWORK

TECHNICAL FIELD

Embodiments relate to a system, a method for processing information, and an information processing apparatus.

BACKGROUND ART

A conference system is conventionally known that in a conference system performed using various kinds of devices connected via a network shares a display image among terminals that a presenter and participants have and, when the presenter writes into the display device, reflects the written contents in the terminals of the participants on all such occasions.

Japanese Laid-open Patent Publication No. 2013-232124 discloses an electronic conference system in which written contents into the terminals by the participants are not displayed on the terminal of the presenter, although written contents into the terminal by the presenter are displayed on the terminals of the participants, for example. The electronic conference system disclosed in Japanese Laid-open Patent Publication No. 2013-232124 stores written data into the terminal by the presenter in a conference control server and stores written data into the terminals by the participants in a web server, thereby reducing loads on the conference control server.

In a conference system including an image projector (referred to as a projector) and an image display apparatus (referred to as an electronic blackboard) that enables writing into an image being displayed, in a situation in which the projector projects an image A, and the electronic blackboard displays an image B, when the image A projected by the projector and the image B displayed by the electronic blackboard are displayed in an exchanged manner in order to respond to a request to write into the image A, the conference system requires to store therein a display image B' in which written contents are merged into the image B on the electronic blackboard, to instruct the projector to display the display image B', and an operational instruction to instruct the electronic blackboard to display the image A, thus causing a problem in that a user is required to manually operate a troublesome procedure.

However, the technique disclosed in Japanese Laid-open Patent Publication No. 2013-232124 is unable to solve the problem that the user is required to perform the troublesome procedure when the image A on the projector and the image B on the electronic blackboard are displayed in an exchanged manner.

In view of the foregoing, there is a need to provide a system, a method for processing information, and an information processing apparatus that can output respective images output by a plurality of devices in an exchanged manner without performing any troublesome operation.

SUMMARY OF THE INVENTION

According to exemplary embodiments of the present invention, there is provided a system comprising a first output apparatus and a second output apparatus that are connected to an information processing apparatus via a network, the system comprising: a job generating unit configured to generate a plurality of jobs that instruct execution of processing to exchange a first image output to the first output apparatus for a second image output to the second output apparatus based on an image exchange instruction received on a screen that receives user operations; and a job execution instructing unit configured to instruct the first output apparatus and the second output apparatus to execute the processing to exchange the first image for the second image based on the jobs. In the system described above, when an instruction to designate the first output apparatus and the second output apparatus and an instruction to start the processing to exchange the output images are received on the screen, the job generating unit refers to job information that associates at least data handled in processing executed by a job, a user who executed the processing, processing information of the processing, a date and time when the processing was executed, and a processing state of the processing with each other, identifies the first image output to the first output apparatus and the second image output to the second output apparatus, and then generates a first job that causes the second output apparatus to output the first image and a second job that causes the first output apparatus to output the second image, and the job execution instructing unit instructs execution of the first job and execution of the second job. And, the system further includes: an image transmitter configured to transmit the first image to the second output apparatus in accordance with the first job and transmit the second image to the first output apparatus in accordance with the second job; and an output unit configured to output the received first image and second image in accordance with the first job and the second job.

BRIEF DESCRIPTION OF DRAWINGS

FIG. 1 is a diagram of an example of a configuration of a system. FIG. 2 is a diagram of an example of a hardware configuration of an information processing server.

FIG. 3 is a functional block diagram of an example of functions that the information processing server has.

FIG. 4 is a diagram of an example of device managing information.

FIG. 5 is a diagram of an example of job information that a job controller uses as control information.

FIG. 6 is a diagram of an example of a hardware configuration of an information terminal.

FIG. 7 is a functional block diagram of an example of functions that the information terminal has.

FIG. 8 is a diagram of an example of functions provided by a client application.

FIG. 9 is a diagram of an example of an initial operating screen.

FIG. 10 is a diagram of an example of an operating screen.

FIG. 11 is a flowchart of an operation example of the information terminal.

FIG. 12 is a diagram of an example of the operating screen.

FIG. 13 is a diagram of an example of an input/output selection screen.

FIG. 14 is a diagram of an example of the input/output selection screen.

FIG. 15 is a sequence diagram of an example of a basic inter-device processing procedure.

FIG. 16 is a flowchart of an example of a processing procedure of the job controller.

FIG. 17 is a sequence diagram of an example of an inter-device processing procedure when there is a written image in an electronic blackboard.

FIG. 18 is a diagram of an example of history information of job information after image exchange processing in response to a swap request is executed.

FIG. 19 is a sequence diagram of an example of an inter-device processing procedure when a written image or an original image can be selected when an image on the electronic blackboard is swapped.

FIG. 20 is a diagram of an example of a pop-up screen that is used for image selection.

FIG. 21 is a diagram of an example of a hardware configuration of a projector.

FIG. 22 is a diagram of an example of a hardware configuration of an electronic blackboard.

FIG. 23 is a diagram of an example of a hardware configuration of an MFP.

The accompanying drawings are intended to depict exemplary embodiments of the present invention and should not be interpreted to limit the scope thereof. Identical or similar reference numerals designate identical or similar components throughout the various drawings.

DESCRIPTION OF EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes embodiments of a system, a method for processing information, and an information processing apparatus according to the present invention in detail with reference to the accompanying drawings.

The system of the present embodiment is a system including a first output apparatus and a second output apparatus that are connected to the information processing apparatus via a network. The information processing apparatus generates a plurality of jobs that instruct the execution of processing to exchange a first image output to the first output apparatus for a second image output to the second output apparatus based on an image exchange instruction received on a screen that receives user operations. The information processing apparatus stores therein job information that associates at least data handled in processing executed by a job, a user who executed the processing, the processing information of the processing, a date and time when the processing was executed, and the processing state of the processing with each other. When an instruction to designate the first output apparatus and the second output apparatus and an instruction to start the processing to exchange the output images are received on the screen that receives user operations, the information processing apparatus refers to the job information, identifies the first image output to the first output apparatus and the second image output to the second output apparatus, and then generates a first job that causes the second output apparatus to output the first image and a second job that causes the first output apparatus to output the second image. The information processing apparatus instructs the first output apparatus and the second output apparatus to execute the processing to exchange the first image for the second image based on the jobs, transmits the first image to the second output apparatus in accordance with the first job, and transmits the second image to the first output apparatus in accordance with the second job. The first output apparatus outputs the second image in accordance with the first job, whereas the second output apparatus outputs the first image in accordance with the second job.

FIG. 1 is diagram of an example of a configuration of a system 100 of the present embodiment. The system 100 of the present embodiment is constructed as a network conference system with a logically closed environment. As illustrated in FIG. 1, the system 100 includes an information processing server 10, a mediator 20, an information terminal 30, a projector 40, an electronic blackboard 50, and an MFP 60. The information processing server 10, the mediator 20, the projector 40, the electronic blackboard 50, and the MFP 60 are connected via a network 70 for conference (hereinafter, simply referred to as a "network 70"). The mediator 20 is an access point, for example, and a range that radio waves emitted by the mediator 20 reach may be referred to as a "border." The mediator 20 is a mediating unit for connecting the information terminal 30 (the information terminal 30 that a conference participant uses) present in the border to the network 70 using a wireless technique such as Bluetooth (registered trademark) and WiFi (registered trademark). Although FIG. 1 exemplifies one information terminal 30 for the convenience of description, this is not limiting, and any number of information terminals 30 are connected to the network 70 via the mediator 20.

The information processing server 10 is an example of an information processing apparatus and performs management of the entire conference, management (storage, deletion, and the like) of data, output control to devices (the projector 40, the electronic blackboard 50, the MFP 60, and the like), and the like. FIG. 2 is a diagram of an example of a hardware configuration of the information processing server 10. As illustrated in FIG. 2, the information processing server 10 includes a central processing unit (CPU) 101, a random access memory (RAM) 102, a read only memory (ROM) 103, a hard disk drive (HDD) 104, a device I/F 105, and a network I/F 108, which are connected with each other via a bus 109. To the device I/F 105, a display unit 106 and an operating unit 107 are connected.

The CPU 101 is an arithmetic unit and comprehensively controls the operation of the entire information processing server 10. The RAM 102 is a volatile storage medium that enables high-speed reading and writing of information and is used as a work area when the CPU 101 processes information. The ROM 103 is a read-only non-volatile storage medium and stores therein computer programs such as firmware. The HDD 104 is a non-volatile storage medium that enables reading and writing of information and stores therein an operating system (OS), various kinds of control programs, application programs, and the like.

The device I/F 105 is an interface for connecting the display unit 106 and the operating unit 107 to the bus 109. The display unit 106 is a visual user interface for displaying various kinds of information and includes a liquid crystal display (LCD), for example. The operating unit 107 is a user interface for causing a user to input various kinds of information to the information processing server 10 such as a keyboard and a mouse. The network I/F 108 is an interface for connecting the information processing server 10 to the network 70.

FIG. 3 is a functional block diagram of an example of functions that the information processing server 10 has (functions executed by the CPU 101 of the information processing server 10). Although FIG. 3 mainly exemplifies the functions concerning the present embodiment for the convenience of description, the functions that the information processing server 10 has are not limited thereto. As illustrated in FIG. 3, the information processing server 10 includes a device managing unit 111, a command analyzing unit 112, a job controller 113, a network controller 114, a data managing unit 115, a history managing unit 116, and a conference database 117.

The device managing unit 111 monitors the other connectable devices connected to the network 70 and the state of the connectable devices and manages available functions. The device managing unit 111 monitors the other connectable devices and the state of the other connectable devices and notifies the information terminal 30 of the available functions. The device managing unit 111 controls the connection with the other connectable devices based on connection device information from the information terminal 30.

FIG. 4 is a diagram of an example of device managing information. As illustrated in FIG. 4, the device managing information is information that associates at least a network-connected device indicating a device connected to the network 70, a device ID identifying a device, permission to connect to the network 70 set by the information terminal 30, and a connection state with a device permitted to connect with each other. In the example in FIG. 4, a network-connected device "PJS-A" indicates a device ID "_____," permission to connect "permission," and a connection state "being connected," for example.

Referring back to FIG. 3, the description continues. The command analyzing unit 112 analyzes a command instruction (described below) received from the information terminal 30, compares the command instruction with the functions managed by the device managing unit 111 (the available functions), and notifies the job controller 113 of processing contents by the other devices. The command analyzing unit 112 can also request the history managing unit 116 to acquire the history information of the job information. Furthermore, the command analyzing unit 112 can receive information on conferences such as the preparation and the editing of a starting time, an ending time, and the like of conferences and participation and leaving in and from conferences (conference information) and can also request the data managing unit 115 to update the conference information.

The job controller 113 generates (constructs) a job for any of the other devices from the contents notified from the command analyzing unit 112, transmits the generated job, instructs the execution of the job, and receives a job response via the network controller 114. Image data acquired by the job response is delivered to the data managing unit 115. The job controller 113 generates a job that projects image data stored in an image accumulation and storage unit (the conference database 117) on the projector 40 and the electronic blackboard 50, transmits the generated job, instructs the execution of the job, and receives a job response, for example. The job controller 113 generates a plurality of jobs that display the output images (display images) of the projector 40 and the electronic blackboard 50 in a swapped manner (in an exchanged manner), transmits the generated jobs to the projector 40 and the electronic blackboard 50, instructs the execution of the jobs by a procedure required for swapping (exchanging) the output images (display images), and receives a job response. Furthermore, the job controller 113 generates a job that acquires a written combined image in which a written image is combined with the output image on the electronic blackboard 50, transmits the generated job, instructs the execution of the job, and receives a job response. The following may refer to processing to exchange two images as "swap." The job controller 113 has the functions of the "job generating unit, the "job execution instructing unit," the "image transmitter," and the "combined image acquiring unit" in the appended claims.

FIG. 5 is a diagram of an example of the job information that the job controller 113 uses as control information. As illustrated in FIG. 5, the job information is information that associates at least data handled in processing executed by a job (image data, for example), a user (an operator) who executed the processing, the processing information of the processing, a date and time when the processing was executed, and the processing state of the processing with each other. In the example in FIG. 5, an image file name (image data) "ABC.jpeg" indicates a user name "Tanaka," processing information "PJS projection," a date and time "Jun. 27, 2015 12:12:00," and a processing state "unused," for example. The unused indicates a state in which although it is the image data stored in the image accumulation and storage unit (the conference database 117), it is not currently projected on the projector 40 or the electronic blackboard 50. An image file name "DEF.pdf" indicates a user name "Sato", processing information "IWB projection", a date and time "Jun. 28, 2015 14:11:11", and a processing state "being projected". An image file name "GHK.jpeg" indicates a user name "Suzuki", processing information "PJS projection", a date and time "Jun. 28, 2015 14:11:14", and a processing state "being projected". The being projected indicates a state in which the image is being currently displayed on the corresponding output apparatus. The image file name indicates image data to be processed. The user name indicates a user who executed (operated) the job. The processing information indicates the contents of the job instructed by the information terminal 30. The date and time indicates a date and time when the job was charged.

Referring back to FIG. 3, the description continues. The network controller 114 controls communication with outside devices via the network I/F 108.

The data managing unit 115 stores the conference information received from the command analyzing unit 112 and the image data received from the job controller 113 in the conference database 117. The data managing unit 115 accumulates image data to be output to the output apparatuses (the projector 40, the electronic blackboard 50, the MFP 60, and the like) by an instruction from the information terminal 30 and stores the image data in the conference database 117 or deletes unnecessary image data, for example. In this example, the data managing unit 115 is an example of the "image accumulation and storage unit." In the example of the present embodiment, the conference database 117 integrally manages data materials for use in conferences (image data and the like) and can include the HDD 104, for example. The data managing unit 115 acquires the conference information and the image data from the conference database 117 in response to a request from the command analyzing unit 112 or the job controller 113 and provides the conference information and the image data. The data managing unit 115 generates the history information of the job information and delivers the history information of the job information to the history managing unit 116. The data managing unit 115 generates the history information of the job information and delivers the history information of the job information to the history managing unit 116 every time the conference information or the image data acquired by the job response is stored, for example. Specific contents of the history information will be described below.

The history managing unit 116 saves (stores) the history information of the job information that the data managing unit 115 has generated in the conference database 117 as an example of a "job information storage unit". In the example of the present embodiment, the history managing unit 116 has the function of the "job information storage unit". The conference database 117 can include the HDD 104, for example. The job information storage unit stores therein the job information that associates at least data handled in processing executed by a job, a user who executed the processing, the processing information of the processing, a date and time when the processing was executed, and the processing state of the processing with each other. The history managing unit 116 acquires the history information of the job information from the conference database 117 and provides the history information of the job information in accordance with a request from the command analyzing unit 112. In this example, the information terminal 30 is notified of the history information of the job information in response to an acquisition request of the history information of the job information from the information terminal 30.

Although the above-described functions that the information processing server 10 has (the device managing unit 111, the command analyzing unit 112, the job controller 113, the network controller 114, the data managing unit 115, and the history managing unit 116,) are implemented by causing the CPU 101 to execute the computer programs stored in the ROM 103 or the like, this is not limiting, and at least part of the functions that the information processing server 10 has may be configured by an exclusive hardware circuit, for example.

FIG. 6 is a diagram of an example of a hardware configuration of the information terminal 30. The information terminal 30 includes a mobile multifunction device (a smart device) such as a smartphone and a tablet. As illustrated in FIG. 6, the information terminal 30 includes a central processing unit (CPU) 201, a random access memory (RAM) 202, a read only memory (ROM) 203, a hard disk drive (HDD) 204, a device I/F 205, and a wireless communication I/F 208, which are connected with each other via a bus 209. To the device I/F 205, a display unit 206 and an operating unit 207 are connected.

The CPU 201 is an arithmetic unit and comprehensively controls the operation of the entire information terminal 30. The RAM 202 is a volatile storage medium that enables high-speed reading and writing of information and is used as a work area when the CPU 201 processes information. The ROM 203 is a read-only non-volatile storage medium and stores therein computer programs such as firmware. The HDD 204 is a non-volatile storage medium that enables reading and writing of information and stores therein an operating system (OS), various kinds of control programs, application programs, and the like.

The device I/F 205 is an interface for connecting the display unit 206 and the operating unit 207 to the bus 209. The display unit 206 is a visual user interface for displaying various kinds of information and includes a liquid crystal display (LCD), for example. The operating unit 207 is a user interface for causing a user to input various kinds of information to the information terminal 30 such as a keyboard and a mouse. The wireless communication I/F 208 is an interface for causing the information terminal 30 to perform wireless communication with the mediator 20.

FIG. 7 is a functional block diagram of an example of functions that the information terminal 30 has (functions executed by the CPU 201 of the information terminal 30). Although FIG. 7 mainly exemplifies the functions concerning the present embodiment for the convenience of description, the functions that the information terminal 30 has are not limited thereto. As illustrated in FIG. 7, the information terminal 30 includes an operation controller 211, a display controller 212, a wireless communication controller 213, and a client application 214. The operation controller 211 acquires an operation signal input via the operating unit 207 and inputs the operation signal to a module operating in the information terminal 30 such as the client application 214. It can also be considered that the operation controller 211 has the function of receiving operations by the user. The display controller 212 is an example of a "display controller" and performs control to display various kinds of information on the information terminal 30 such as a graphical user interface (GUI) of the client application 214 on the display unit 206. The wireless communication controller 213 controls communication with another device via the wireless communication I/F 208. The wireless communication controller 213 acquires information input via the wireless communication I/F 208 and transmits information to be transmitted to the other device via the wireless communication I/F 208, for example.

The client application 214 is a software module that provides various kinds of functions in the information terminal 30 and includes software programs corresponding to the respective functions. An exclusive application for utilizing the conference system according to the present embodiment is also contained in the client application 214. The client application 214 has the functions of the "accumulated image transmitter," the "output information transmitter," the "job generating unit," and the "job transmitter" in the appended claims.

FIG. 8 is a diagram of an example of the functions provided by the client application 214. Although FIG. 8 exemplifies only the function according to the present embodiment for the convenience of description, the functions provided by the client application 214 are not limited thereto. As illustrated in FIG. 8, the client application 214 includes a command instruction generating unit 301 and a command instruction transmitter 302.

The command instruction generating unit 301 generates the command instruction in response to a user's operation received on an operating screen described below. Specific contents of the command instruction will be described below. The command instruction transmitter 302 transmits the command instruction generated by the command instruction generating unit 301 to the information processing server 10 via the mediator 20. The information processing server 10 that has received the command instruction generates a job based on the received command instruction. The generated job is transmitted to a target device, and the history information of the job information is stored based on a job response received from the device. As illustrated in FIG. 5, the job information is information that associates at least data handled in processing executed by a job (image data, for example), a user (an operator) who executed the processing, the processing information of the processing, a date and time when the processing was executed, and the processing state of the processing with each other. Specific details of the history information of the job information will be described below.

Although the above-described functions that the information terminal 30 has are implemented by causing the CPU 201 to execute the computer programs stored in the ROM 203 or the like, this is not limiting, and at least part of the functions that the information terminal 30 has may be configured by an exclusive hardware circuit, for example.

For the purpose of enabling display images displayed on two output apparatuses to be exchanged without performing any troublesome operation, the system 100 of the present embodiment can generate a job that instructs the execution of the processing to exchange the first image output to the first output apparatus for the second image output to the second output apparatus and instruct the execution of the job. More specifically, the information terminal 30 generates a command instruction that designates the first output apparatus and the second output apparatus and that designates the start of the processing to exchange the output images in accordance with an instruction received on the screen that receives user operations and transmits the generated command instruction to the information processing server 10. The information processing server 10 that has received the command instruction generates a job that instructs a device designated by the command instruction to execute processing designated by the command instruction using data designated by the command instruction. In this example, a combination of the command analyzing unit 112 and the job controller 113 can be considered to correspond to the "job generating unit." The information processing server 10 transmits the generated job to the target device. The device executes processing following the job received from the information processing server 10 and then transmits a job response to the information processing server 10. The information processing server 10 stores therein the history information of the job information corresponding to the job transmitted to the device based on the job response received from the device.

The following describes a method by which the information terminal 30 generates the command instruction. The following will be described based on the premise that the execution of processing to exchange display images currently displayed on the projector 40 and the electronic blackboard 50 is instructed.

First, with an initial operating screen as illustrated in FIG. 9 displayed on the display unit 206, upon reception of an operation to select an item of "select from devices" (an operation to press an icon of "select from devices"), the display controller 212 displays the operating screen corresponding to "select from devices" as illustrated in FIG. 10 on the display unit 206. The following describes an example of screen transition from the operating screen corresponding to "select from devices" with reference to FIG. 11.

As illustrated in FIG. 11, the display controller 212 displays the operating screen corresponding to "select from devices" on the display unit 206 (Step S1). Next, an operation to select a device type is received (Step S2). This example will be described based on the premise that an operation to select "IWB" as the device type (an operation to press an icon of "IWB" illustrated in FIG. 10) has been received. Next, the display controller 212 displays the operating screen corresponding to the device type selected at Step S2 on the display unit 206 (Step S3). In this example, the operating screen corresponding to "IWB" is as illustrated in FIG. 12.

Next, an operation to select a function type is received (Step S4). This example will be described based on the premise that an operation to select "projection" as the function type (an operation to press an icon of "projection" illustrated in FIG. 12) has been received. Next, the display controller 212 displays an input/output selection screen as illustrated in FIG. 13 on the display unit 206 (Step S5). In the input/output selection screen, one of the output apparatuses for which the display image is changed is selected ("Projector 1" is selected in a pull-down menu illustrated in FIG. 13) as input selection to receive an operation to select an input device (Step S6). Output selection is automatically input ("IWB1" illustrated in FIG. 13) by default upon reception of an operation to select "IWB" as the function type (an operation to select an icon of "IWB illustrated in FIG. 13). In other words, an operation to select an output device is received (Step S7). In the pull-down menu of the output selection illustrated in FIG. 13, the automatically input "IWB1" can be changed.

Next, it is selected whether the images of the input device and the output device are to be exchanged (Step S8). If the images are to be exchanged (Yes at Step S8), a check mark is placed (Step S9). If the images are not to be exchanged (No at Step S8), the check mark is removed (Step S11). Next, an operation to select "start projection" (an operation to press an icon of "start projection" illustrated in FIG. 13) is received (Step S10). Next, when the operation to select "start projection" has been received with the check mark placed to receive an operation to instruct the execution of image exchange processing (the operation to press the icon of "start projection" in this example), the command instruction of the image exchange processing is generated based on the set input device and output device, and the generated command instruction is transmitted to the information processing server 10. In other words, the screen that receives user operations has a selection button (the check mark illustrated in FIG. 13) that receives the processing to exchange the output images, and when the instruction to start the processing to exchange the output images has been received with the selection button selected (when the operation to select "start projection" has been received with the check mark placed), the job generating unit refers to the job information and generates the first job and the second job. The first job is a job that causes the second output apparatus (the electronic blackboard 50) to output the first image (the projector 40), whereas the second job is a job that causes the first output apparatus (the projector 40) to output the second image (the electronic blackboard 50).

When the operation to select "start projection" has been received with the check mark removed to receive an operation to instruct the execution of image display (the operation to press the icon of "start projection" in this example), the command instruction of image display processing is generated based on the set input device and output device, and the generated command instruction is transmitted to the information processing server 10. In other words, the screen that receives user operations has a selection button (the check mark illustrated in FIG. 13) that receives the processing to exchange the output images, and when an instruction to start processing to output an image has been received without the selection button selected (when the operation to select "start projection" has been received with the check mark removed), the job generating unit refers to the job information, identifies the first image output to the first output apparatus (the projector 40), and then generates the first job that causes the second output apparatus (the electronic blackboard 50) to output the first image, the job execution instructing unit instructs the execution of the job, the image transmitter transmits the first image to the second output apparatus (the electronic blackboard 50) in accordance with the first job, and the output unit (the electronic blackboard 50) outputs the received first image in accordance with the first job. In other words, an output image transmitter receives output information that designates an image to be output from the information terminal 30 and an output apparatus as the command instruction, identifies an image stored in the image accumulation and storage unit, and transmits the image to the designated output apparatus based on the output information.

In the operating screen illustrated in FIG. 13, when "IWB" is selected as the device type, and "projection" is selected as the function type, "IWB1" is automatically input to the output selection by default. When an operation to select "end projection" has been received in this situation, an operation to instruct the execution of processing to hide an image displayed on "IWB1" has been received. In this case, the command instruction of processing to cancel image display on "IWB1" is generated, and the generated command instruction is transmitted to the information processing server 10.

In the example in FIG. 13, an item of "scan conditions" is displayed. The "scan conditions" is displayed only in a case when the input device is an MFP.

The above describes the instruction of the execution of the processing to exchange display screens with the images already displayed on the projector 40 and the electronic blackboard 50. The following describes an instruction of the execution of processing to cause the projector 40 and the electronic blackboard 50 that are displaying nothing to display images.

FIG. 14 is a diagram of an example of the input/output selection screen displayed on the display unit 206. The input/output selection screen illustrated in FIG. 14 is a consequence of the initial operating screen as illustrated in FIG. 9 with an item of "select from devices" selected, with "IWB" selected as the device type, and with "projection" selected as the function type. In this process, when the input selection is selected to receive an operation to select an input file, the display controller 212 displays a file selection screen as illustrated in FIG. 14 on the display unit 206. The user can select any of the history information of the job information displayed on the input/output selection screen (the default history information or search result list) as the input file, for example, and can also select the input file from the image data that the information processing server 10 holds as conference materials, for example. In this example, when an operation to press an icon of "local file" on the input/output selection screen illustrated in the lower diagram of FIG. 14 has been received, the display controller 212 displays a list of image data that the information processing server 10 holds on the input/output selection screen, and the user can perform an operation to select any of the displayed data as the input file.

The diagram illustrated on the lower part of FIG. 14 is a diagram obtained after the information terminal 30 (the display controller 212, for example) acquires the history information of the job information held by the conference database 117 (the history information with an amount that can be displayed on the information terminal 30) from the information processing server 10 and displays the history information of the job information on the input/output selection screen. Only partial items among the items contained in the history information of the job information may be displayed, for example. The history information of the job information is information that associates at least processing, a date and time when the processing was executed, data (image data, for example) handled in the processing, and a device that executed the processing with each other. The history information of the job information illustrated in the lower diagram of FIG. 14 is information that associates a history ID identifying history information, a conference ID identifying a conference, a user name identifying the user (operator) of the information terminal 30 that issued a command instruction, a document/image file path identifying data handled in the processing (indicating a position at which the data is stored in the conference database 117 in this example), device information indicating a device that executed the processing, and processing information indicating the contents of the processing with each other.

When selecting the input file from the history information of the job information, the user can select any one item by a pull-down menu (a pull-down menu for selecting an item) 401 illustrated in the lower diagram of FIG. 14. Next, the user can select any one candidate by a pull-down menu 402 for selecting a candidate corresponding to the selected item.

Next, a device that is caused to output an image file is selected by the output selection. As illustrated in FIG. 13, when "IWB" is selected as the device type, and "projection" is selected as the function type, "IWB1" is automatically input to the output selection by default. In FIG. 13, when the operation to select "start projection" has been received with the check mark removed to receive the operation to instruct the execution of image display (the operation to press the icon of "start projection" in this example), the command instruction of the image display processing is generated based on the selected image file and the set output device, and the generated command instruction is transmitted to the information processing server 10.

The following describes the processing flow of the conference system of the present embodiment. FIG. 15 is a sequence diagram of an example of a basic inter-device processing procedure. The following describes a case in which the information terminal 30 has generated a command instruction indicating that an image to be projected on the projector 40 or an image to be displayed on the electronic blackboard 50 is displayed and a case in which the information terminal 30 has generated a command instruction indicating that images displayed on the projector 40 and the electronic blackboard 50 are hidden by the above procedure as examples.

First, the information terminal 30 transmits a device connection information acquisition request to the information processing server (the device managing unit 111) 10 (Step S21). The information processing server (the device managing unit 111) 10 searches for a device connected to the network 70 in accordance with the device connection information acquisition request. The information processing server (the device managing unit 111) 10 transmits a search result to the information terminal 30 as a device connection information acquisition response (Step S22). Next, the information terminal 30 transmits a device connection information setting request to the information processing server (the device managing unit 111) 10 (Step S23). The information processing server (the device managing unit 111) 10 sets connection permission/rejection for the device connected to the network 70 in accordance with the device connection information setting request. In this example, as illustrated in FIG. 4, PJS-A, PJS-B, and IWB-A set "permission," "rejection," and "permission," respectively. The information processing server (the device managing unit 111) 10 transmits a device connection information setting response to the information terminal 30 (Step S24). Next, the information terminal 30 transmits an image file (DEF/GHK) accumulation request to the information processing server (the data managing unit 115) 10 with image files (DEF/GHK) attached (Step S25). In other words, the accumulated image transmitter receives the designation of an image to be output to the first output apparatus (the projector 40) or the second output apparatus (the electronic blackboard 50) on the screen of the information terminal 30 and transmits the image. The information processing server (the data managing unit 115) 10 receives the image files (DEF/GHK) and stores the image files (DEF/GHK) in the conference database 117. In other words, the image accumulation and storage unit receives an image and accumulates and stores therein the image. The information processing server (the data managing unit 115) 10 transmits an image file (DEF/GHK) accumulation response to the information terminal 30 (Step S26).

Next, the information terminal 30 transmits an image file (GHK) display request (PJS) to the information processing server (the job controller 113) 10 (Step S27). In this example, the command instruction of the image display processing to output an image file (GHK) to the projector (PJS) 40 is generated by the above procedure, and the generated command instruction is transmitted to the information processing server 10. Next, the information processing server (the job controller 113) 10 transmits an image file (GHK) display request to the projector (PJS) 40 (Step S28). In other words, the information processing server (the job controller 113) 10 that has received the command instruction analyzes the received command and generates a job. In this example, the information processing server (the job controller 113) 10 generates an image display job that instructs the projector (PJS) 40 to execute processing to display an image and transmits the image file (GHK) to the projector (PJS) 40 in accordance with the generated image display job. The projector (PJS) 40 outputs the image file (GHK) and transmits an image file (GHK) display response to the information processing server (the job controller 113) 10 (Step S29). Next, the information processing server (the job controller 113) 10 transmits an image file (GHK) display response (PJS) to the information terminal 30 (Step S30). The information processing server (the job controller 113) 10 requests the information processing server (the history managing unit 116) 10 to store therein the history information of the job information (Step S31). The information processing server (the history managing unit 116) 10 saves (stores) the history information of the job information in the conference database 117.

Next, the information terminal 30 transmits an image file (DEF) display request (IWB) to the information processing server (the job controller 113) 10 (Step S32). In this example, the command instruction of the image display processing to output an image file (DEF) to the electronic blackboard (IWB) 50 is generated by the above procedure, and the generated command instruction is transmitted to the information processing server 10. Next, the information processing server (the job controller 113) 10 transmits an image file (DEF) display request to the electronic blackboard (IWB) 50 (Step S33). In other words, the information processing server (the job controller 113) 10 that has received the command instruction analyzes the received command and generates a job. In this example, the information processing server (the job controller 113) 10 generates an image display job that instructs the electronic blackboard (IWB) 50 to execute processing to display an image and transmits the image file (DEF) to the electronic blackboard (IWB) 50 in accordance with the generated image display job. The electronic blackboard (IWB) 50 outputs the image file (DEF) and transmits an image file (DEF) display response to the information processing server (the job controller 113) 10 (Step S34). Next, the information processing server (the job controller 113) 10 transmits an image file (DEF) display response (IWB) to the information terminal 30 (Step S35). The information processing server (the job controller 113) 10 requests the information processing server (the history managing unit 116) 10 to store therein the history information of the job information (Step S36). The information processing server (the history managing unit 116) 10 saves (stores) the history information of the job information in the conference database 117.

Next, the information terminal 30 transmits an image file (GHK) hide request (PJS) to the information processing server (the job controller 113) 10 (Step S37). In this example, the command instruction of hide processing to cancel the output of the image file (GHK) to the projector (PJS) 40 is generated by the above procedure, and the generated command instruction is transmitted to the information processing server 10. Next, the information processing server (the job controller 113) 10 transmits an image file (GHK) hide request to the projector (PJS) 40 (Step S38). In other words, the information processing server (the job controller 113) 10 that has received the command instruction analyzes the received command and generates a job. In other words, when an instruction to designate the first output apparatus (the projector 40) or the second output apparatus (electronic blackboard 50) and an instruction to cancel image output to the output apparatus have been received on the screen that receives user operations, the job generating unit refers to the job information and generates a job that cancels the image output to the designated output apparatus, and the output unit of the output apparatus cancels the image output to the output apparatus in accordance with the job. In this example, the information processing server (the job controller 113) 10 generates a hide job that instructs the projector (PJS) 40 to execute processing to hide an image and transmits the cancel of the display of the image file (GHK) to the projector (PJS) 40 in accordance with the generated hide job. The projector (PJS) 40 cancels the output of the image file (GHK) and transmits an image file (GHK) hide response to the information processing server (the job controller 113) 10 (Step S39). Next, the information processing server (the job controller 113) 10 transmits an image file (GHK) hide response (PJS) to the information terminal 30 (Step S40). The information processing server (the job controller 113) 10 requests the information processing server (the history managing unit 116) 10 to store therein the history information of the job information (Step S41). The information processing server (the history managing unit 116) 10 saves (stores) the history information of the job information in the conference database 117.

Next, the information terminal 30 transmits an image file (DEF) hide request (IWB) to the information processing server (the job controller 113) 10 (Step S42). In this example, the command instruction of the hide processing to cancel the output of the image file (DEF) to the electronic blackboard (IWB) 50 is generated by the above procedure, and the generated command instruction is transmitted to the information processing server 10. Next, the information processing server (the job controller 113) 10 transmits an image file (DEF) hide request to the electronic blackboard (IWB) 50 (Step S43). In other words, the information processing server (the job controller 113) 10 that has received the command instruction analyzes the received command and generates a job. In this example, the information processing server (the job controller 113) 10 generates a hide job that instructs the electronic blackboard (IWB) 50 to execute processing to hide an image and transmits the cancel of the display of the image file (DEF) to the electronic blackboard (IWB) 50 in accordance with the generated hide job. The electronic blackboard (IWB) 50 cancels the output of the image file (DEF) and transmits an image file (DEF) hide response to the information processing server (the job controller 113) 10 (Step S44). Next, the information processing server (the job controller 113) 10 transmits an image file (DEF) hide response (IWB) to the information terminal 30 (Step S45). The information processing server (the job controller 113) 10 requests the information processing server (the history managing unit 116) 10 to store therein the history information of the job information (Step S46). The information processing server (the history managing unit 116) 10 saves (stores) the history information of the job information in the conference database 117.

Next, the information terminal 30 transmits an image file (DEF/GHK) delete request to the information processing server (the data managing unit 115) 10 (Step S47). The information processing server (the data managing unit 115) 10 deletes the image files (DEF/GHK) stored in the conference database 117. The information processing server (the data managing unit 115) 10 transmits an image file (DEF/GHK) delete response to the information terminal 30 (Step S48).

Next, the information terminal 30 transmits a device connection information setting request to the information processing server (the device managing unit 111) 10 (Step S49). The information processing server (the device managing unit 111) 10 sets connection permission/rejection for the device connected to the network 70 in accordance with the device connection information setting request. The information processing server (the device managing unit 111) 10 transmits a device connection information setting response to the information terminal 30 (Step S50).

As described above, the information terminal 30 generates the command instruction of the image display processing for the selected image file and the set output device based on a user operation received on the input/output selection screen that receives user operations and transmits the generated command instruction to the information processing server 10. The information processing server 10 that has received the command instruction analyzes the received command and generates a job. The information processing server 10 transmits the image file to the projector 40 and the electronic blackboard 50 and enables the projector 40 and the electronic blackboard 50 to display the image file in accordance with the generated job.

The following describes a processing flow of the job controller 113 of the information processing server 10. FIG. 16 is a flowchart of an example of a processing procedure of the job controller 113.

First, the job controller 113 determines whether a command instruction request has been received from the information terminal 30 (Step S71). If no request has been received (No at Step S71), the determination processing at Step S71 will be repeated. If the request has been received (Yes at Step S71), the job controller 113 determines whether the command instruction request is an image displaying command instruction request (Step S72). If the command instruction request is not the image displaying command instruction request (No at Step S72), the job controller 113 determines that the command instruction request is a command instruction request of hide processing that hides image display, analyzes the command, and generates a job. The job controller 113 generates a hide job that instructs the projector (PJS) 40 to execute processing to hide an image, for example (Step S73). The process advances to Step S77.

If the command instruction request is the image displaying command instruction request (Yes at Step S72), the job controller 113 determines whether the command instruction request is an image exchanging command instruction request (Step S74). If the command instruction request is not the image exchanging command instruction request (No at Step S74), the job controller 113 determines that the command instruction request is a command instruction request of display processing that displays an image, analyzes the command, and generates a job. The job controller 113 generates an image display job that instructs the projector (PJS) 40 to execute processing to display an image, for example (Step S75). The process advances to Step S77.

If the command instruction request is the image exchanging command instruction request (Yes at Step S74), the job controller 113 generates an image exchange job that instructs the execution of the image exchange processing that exchanges images (Step S76). Next, the job controller 113 transmits the generated job to the target device, instructs the target device to execute the processing following the job, and causes the target device to execute the job (Step S77). Next, based on a job response received from the device, the job controller 113 transmits a request to store the history information of the job information corresponding to the job transmitted to the device to the history managing unit 116, and the history managing unit 116 saves (stores) the history information of the job information in the conference database 117 (Step S78).

The following describes a processing flow of the conference system of the present embodiment. FIG. 17 is a sequence diagram of an example of an inter-device processing procedure when there is a written image in the electronic blackboard 50. The following describes a case in which the information terminal 30 has generated a command instruction indicating that an image projected on the projector 40 and an image displayed on the electronic blackboard 50 are exchanged (swapped) by the above procedure as an example. The following refers to a written combined image in which a written image is combined with an image file being displayed on the electronic blackboard 50 simply as a "written image."

As a premise, the projector (PJS) 40 is displaying the image file (GHK), and the electronic blackboard (IWB) 50 is displaying the image file (DEF) (Step S81).

First, the information terminal 30 transmits an image file (DEF/GHK) swap request (an image exchange request) to the information processing server (the job controller 113) 10 (Step S82). In this example, the command instruction of the image exchange processing to exchange the image file (GHK) being displayed on the projector (PJS) 40 for the image file (DEF) being displayed on the electronic blackboard (IWB) 50 is generated (the projector 40 is selected in the input selection illustrated in FIG. 13, the electronic blackboard 50 is selected in the output selection, and a check mark is placed in the exchange images of input device) by the above procedure, and the generated command instruction is transmitted to the information processing server 10. In this example, the job generating unit generates a job that instructs the execution of processing to exchange the first image output to the first output apparatus (the projector 40) for the second image output to the second output apparatus (the electronic blackboard 50) based on a user operation received on the screen that receives user operations. Next, the information processing server (the job controller 113) 10 transmits an image file (DEF)-written image acquisition request to the electronic blackboard (IWB) 50 (Step S83). In other words, the information processing server (the job controller 113) 10 that has received the command instruction analyzes the received command and generates a job. In other words, the job generating unit refers to the job information and generates a third job that acquires a written combined image in which a written image is combined with the second image output to the second output apparatus (the electronic blackboard 50). In this example, the information processing server (the job controller 113) 10 generates an image acquisition job that instructs the electronic blackboard (IWB) 50 to execute processing to acquire the written image and executes processing to acquire an image file (DEF)-written image file in accordance with the generated image acquisition job. In other words, the combined image acquiring unit acquires the written combined image in accordance with the third job. The electronic blackboard (IWB) 50 transmits the image file (DEF)-written image file to the information processing server (the job controller 113) 10 and transmits an image file (DEF)-written image acquisition response to the information processing server (the job controller 113) 10 (Step S84). The information processing server (the job controller 113) 10 requests the information processing server (the history managing unit 116) 10 to store therein the history information of the job information (Step S85). The information processing server (the history managing unit 116) 10 saves (stores) the history information of the job information in the conference database 117. At Step S83 and Step S84, the combined image acquiring unit acquires the written combined image if there is any written image to the second image (the electronic blackboard 50) and is not required to acquire the written combined image if there is no written image.

Next, the information processing server (the job controller 113) 10 transmits an image file (DEF)-written image accumulation request for storing the acquired image file (DEF)-written image file to the information processing server (the data managing unit 115) 10 (Step S86). In this example, the information processing server (the job controller 113) 10 generates an image storage job that instructs the electronic blackboard (IWB) 50 to execute processing to accumulate and store therein a written image and executes processing to store the image file (DEF)-written image file in accordance with the generated image storage job. The information processing server (the data managing unit 115) 10 saves (stores) the image file (DEF)-written image file in the conference database 117. The information processing server (the data managing unit 115) 10 transmits an image file (DEF)-written image accumulation response to the information processing server (the job controller 113) 10 (Step S87). The information processing server (the job controller 113) 10 requests the information processing server (the history managing unit 116) 10 to store therein the history information of the job information (Step S88). The information processing server (the history managing unit 116) 10 saves (stores) the history information of the job information in the conference database 117.

Next, the information processing server (the job controller 113) 10 transmits a written image file display request to the projector (PJS) 40 (Step S89). In other words, the job generating unit generates a fourth job that causes the first output apparatus (the projector 40) to output the written image file (the written combined image). The image transmitter transmits the written image file (the written combined image) to the first output apparatus (the projector 40) in accordance with the fourth job. In this example, the information processing server (the job controller 113) 10 generates an image display job that instructs the projector (PJS) 40 to execute processing to display the written image and transmits the written image file to the projector (PJS) 40 in accordance with the generated image display job. The projector (PJS) 40 as the output unit outputs the written image file and transmits a written image file display response to the information processing server (the job controller 113) 10 (Step S90). The information processing server (the job controller 113) 10 requests the information processing server (the history managing unit 116) 10 to store therein the history information of the job information (Step S91). The information processing server (the history managing unit 116) 10 saves (stores) the history information of the job information in the conference database 117.

Next, the information processing server (the job controller 113) 10 transmits an image file (GHK) display request to the electronic blackboard (IWB) 50 (Step S92). In other words, the job generating unit generates the first job that causes the second output apparatus (the electronic blackboard 50) to output the first image. In this example, the information processing server (the job controller 113) 10 generates an image display job that instructs the electronic blackboard (IWB) 50 to execute processing to display an image and transmits the image file (GHK) to the electronic blackboard (IWB) 50 in accordance with the generated image display job. The electronic blackboard (IWB) 50 as the output unit outputs the image file (GHK) and transmits an image file (GHK) display response to the information processing server (the job controller 113) 10 (Step S93). The information processing server (the job controller 113) 10 requests the information processing server (the history managing unit 116) 10 to store therein the history information of the job information (Step S94). The information processing server (the history managing unit 116) 10 saves (stores) the history information of the job information in the conference database 117. The information processing server (the job controller 113) 10 transmits an image file (DEF/GHK) swap response to the information terminal 30 (Step S95).

FIG. 18 is a diagram of an example of the history information of the job information after image exchange processing in response to the swap request is executed. The history information of the job information illustrated in FIG. 18 is information stored with the history updated for the job information described with reference to FIG. 5. As illustrated in FIG. 18, the data handled in processing executed by a job "image file (DEF.pdf)" has become a processing state "unused," and the "image file (GHK.jpeg)" has become a processing state "unused." An image file name (image data) "DEF-written.pdf" as new job information indicates a user name "Takahashi," processing information "PJS projection," a date and time "Jun. 28, 2015 14:15:00," and a processing state "being projected." The image file name (image data) "GHK.jpeg" indicates a user name "Takahashi," processing information "IWB projection," a date and time "Jun. 28, 2015 14:15:05," and a processing state "being projected."

The history information of the job information illustrated in FIG. 18 is an example and can be configured like the history information of the job information illustrated in the lower diagram of FIG. 14, for example, when the history information is desired to be searched for.

FIG. 19 is a sequence diagram of an example of an inter-device processing procedure when a written image or an original image can be selected when the image on the electronic blackboard 50 is swapped. The following describes a case in which the information terminal 30 has generated a command instruction indicating that an image projected on the projector 40 and an image displayed on the electronic blackboard 50 are exchanged (swapped) by the above procedure as an example. The following refers to a written combined image in which a written image is combined with an image file being displayed simply as a "written image."

As a premise, the projector (PJS) 40 is displaying the image file (GHK), and the electronic blackboard (IWB) 50 is displaying the image file (DEF) (Step S101).

First, the information terminal 30 transmits an image file (DEF/GHK) swap request (an image exchange request) to the information processing server (the job controller 113) 10 (Step S102). In this example, the command instruction of the image exchange processing to exchange the image file (GHK) being displayed on the projector (PJS) 40 for the image file (DEF) being displayed on the electronic blackboard (IWB) 50 is generated by the above procedure, and the generated command instruction is transmitted to the information processing server 10. Next, the information processing server (the job controller 113) 10 transmits an image file (DEF)-written image acquisition request to the electronic blackboard (IWB) 50 (Step S103). In other words, the information processing server (the job controller 113) 10 that has received the command instruction analyzes the received command and generates a job. In this example, the information processing server (the job controller 113) 10 generates an image acquisition job that instructs the electronic blackboard (IWB) 50 to execute the processing to acquire the written image and executes the processing to acquire the image file (DEF)-written image file in accordance with the generated image acquisition job. The electronic blackboard (IWB) 50 transmits the image file (DEF)-written image file to the information processing server (the job controller 113) 10 and transmits an image file (DEF)-written image acquisition response to the information processing server (the job controller 113) 10 (Step S104). The information processing server (the job controller 113) 10 requests the information processing server (the history managing unit 116) 10 to store therein the history information of the job information (Step S105). The information processing server (the history managing unit 116) 10 saves (stores) the history information of the job information in the conference database 117.

Next, the information processing server (the job controller 113) 10 transmits an image file (DEF)-written image accumulation request for storing the acquired image file (DEF)-written image file to the information processing server (the data managing unit 115) 10 (Step S106). In this example, the information processing server (the job controller 113) 10 generates an image storage job that instructs the electronic blackboard (IWB) 50 to execute processing to accumulate and store therein a written image and executes processing to store the image file (DEF)-written image file in accordance with the generated image storage job. The information processing server (the data managing unit 115) 10 saves (stores) the image file (DEF)-written image file in the conference database 117. The information processing server (the data managing unit 115) 10 transmits an image file (DEF)-written image accumulation response to the information processing server (the job controller 113) 10 (Step S107). The information processing server (the job controller 113) 10 requests the information processing server (the history managing unit 116) 10 to store therein the history information of the job information (Step S108). The information processing server (the history managing unit 116) 10 saves (stores) the history information of the job information in the conference database 117.

In this process, the information processing server (the job controller 113) 10 transmits a written image file use inquiry request to the information terminal 30 (Step S109). The display unit 206 of the information terminal 30 displays a pop-up screen that is used for image selection as illustrated in FIG. 20 by the control of the display controller 212. In other words, when the second output apparatus is an electronic blackboard, the display controller performs control to display an icon to select any of the written combined image and an original image indicating an output image before being combined with a written image on the screen. The user can select an "original image" or a "written image" as an image to be exchanged (swapped) on the image selection screen illustrated in FIG. 20. The example in FIG. 20 indicates that the "written image" has been checked to be selected. The information terminal 30 transmits a written image file use inquiry result to the information processing server (the job controller 113) 10 as a response to the request (Step S110). In other words, the image transmitter transmits the written combined image to the first output apparatus (the projector 40) if the icon to select the written combined image has been selected on the pop-up screen that is used for image selection and transmits the original image to the first output apparatus (the projector 40) if the icon to select the original image has been selected on the screen.

Referring back to FIG. 19, the description continues. Next, the information processing server (the job controller 113) 10 transmits a written image file display request to the projector (PJS) 40 (Step S111). In this example, the information processing server (the job controller 113) 10 generates an image display job that instructs the projector (PJS) 40 to execute the processing to display the written image and transmits the written image file to the projector (PJS) 40 in accordance with the generated image display job. The projector (PJS) 40 outputs the written image file and transmits a written image file display response to the information processing server (the job controller 113) 10 (Step S112). The information processing server (the job controller 113) 10 requests the information processing server (the history managing unit 116) 10 to store therein the history information of the job information (Step S113). The information processing server (the history managing unit 116) 10 saves (stores) the history information of the job information in the conference database 117.

Next, the information processing server (the job controller 113) 10 transmits an image file (GHK) display request to the electronic blackboard (IWB) 50 (Step S114). In this example, the information processing server (the job controller 113) 10 generates an image display job that instructs the electronic blackboard (IWB) 50 to display an image and transmits the image file (GHK) to the electronic blackboard (IWB) 50 in accordance with the generated image display job. The electronic blackboard (IWB) 50 outputs the image file (GHK) and transmits an image file (GHK) display response to the information processing server (the job controller 113) 10 (Step S115). The information processing server (the job controller 113) 10 requests the information processing server (the history managing unit 116) 10 to store therein the history information of the job information (Step S116). The information processing server (the history managing unit 116) 10 saves (stores) the history information of the job information in the conference database 117. The information processing server (the job controller 113) 10 transmits an image file (DEF/GHK) swap response to the information terminal 30 (Step S117).

As described above, the present embodiment generates a plurality of jobs that instruct the execution of processing to exchange the first image output to the first output apparatus for the second image output to the second output apparatus based on the instruction received on the screen that receives user operations and instructs the first output apparatus and the second output apparatus to execute the processing to exchange the first image for the second image based on the jobs. The present embodiment can output respective images output by a plurality of devices in an exchanged manner without performing any troublesome operation.

Modification

Although in the above embodiment the information processing server 10 generates the jobs based on the command instructions received from the information terminal 30, in a modification the information terminal 30 generates a plurality of jobs that instruct the execution of processing to exchange the first image output to the first output apparatus for the second image output to the second output apparatus based on an image exchange instruction received on a screen that receives user operations and instructs the execution of the jobs by a procedure required for swapping (exchanging) output images (display images). In the present modification, the information terminal 30 has the function of the job controller 113 of the information processing server 10. In the present modification, the information terminal 30 generates a plurality of jobs for exchanging (swapping) the display images and controls the procedure for executing the jobs, whereby loads on the information processing server 10 can be reduced. The present modification can output respective images output by a plurality of devices in an exchanged manner without performing any troublesome operation.

The system 100 of the present embodiment is only required to generate a plurality of jobs that instruct the execution of the processing to exchange the first image output to the first output apparatus for the second image output to the second output apparatus based on the instruction received on the screen that receives user operations and to instruct the execution of the jobs by the procedure required for swapping (exchanging) the output images (display images).

Although the embodiments and modification according to the present invention have been described, the present invention is not limited to the embodiments as they are and can be embodied with the components modified without departing from the essence thereof in an implementing stage. An appropriate combination of a plurality of components disclosed in the embodiments can form various kinds of inventions. Some components may be deleted from all the components disclosed in the embodiments, for example. Furthermore, components across different embodiments and modifications may appropriately be combined.

Computer programs executed by the system 100 of the embodiments may be recorded and provided in a computer-readable recording medium such as a compact disc read only memory (CD-ROM), a flexible disk (FD), a compact disc recordable (CD-R), a digital versatile disc (DVD), and universal serial bus (USB) as an installable or executable file or provided or distributed via a network such as the Internet. Various kinds of computer programs may be embedded in advance and provided in a ROM, for example.

FIG. 21 is a schematic diagram of an example of a hardware configuration of the projector 40. As illustrated in FIG. 21, the projector 40 includes a CPU 411, a storage unit 412, an input unit 413, a network I/F 414, and a projecting unit 415, which are connected with each other via a bus.

The CPU 411 executes a computer program stored in the storage unit 412 and comprehensively controls the operation of the projector 40. The storage unit 412 includes a ROM and an HDD that store therein the computer program that the CPU 411 executes and data required for the execution of the computer program, and a RAM that functions as a work area of the CPU 411. The input unit 413 performs various kinds of input to the projector 40 and is a touch panel, a key switch, or the like. The network I/F 414 is an interface for connecting the projector 40 to the network 70. The projecting unit 415 projects image data as an object to be projected onto a projected object such as a screen. The projecting unit 415 includes an optical system for projection such as projection lenses, for example. The projecting unit 415 corresponds to the "output unit" in the appended claims.

FIG. 22 is a schematic diagram of an example of a hardware configuration of the electronic blackboard 50. As illustrated in FIG. 22, the electronic blackboard 50 includes a CPU 511, a ROM 512, a RAM 513, a hard disk drive (HDD) 514, a graphics board 515, a display 516, a detector 517, and a network I/F 518, which are connected with each other via a bus.

The CPU 511 reads a computer program stored in the ROM 512, the HDD 514, or the like onto the RAM 513 to execute the computer program and comprehensively controls the operation of the electronic blackboard 50. The graphics board 515 is an apparatus that processes drawing data to be drawn on the display 516 and includes a video RAM (VRAM) that holds images and connecting terminals of the display 516. The display 516 is a display apparatus that displays the drawing data generated by the graphics board 515. The CPU 511 implements the function of the "combined image generating unit" in the appended claims. The combined image generating unit generates a written combined image in which a written image is combined with the output image (display image) on the electronic blackboard 50. The written combined image is an image being currently displayed, and when the processing of display image acquisition is executed, the image being displayed is generated as the written combined image.

The detector 517 is a detector that detects the fact that an object has been in contact with the detector or close to the detector. A touch panel including a capacitance sensor that detects capacitance that changes caused by contact with an object (a finger, an exclusive stylus pen, or the like) corresponds to the detector 517, for example. When contact position coordinates or close position coordinates are detected by the detector 517, the graphics board 515 draws a drawn image (a hand-drawn image) based on the detected contact position coordinates or close position coordinates and draws the drawn image on a background image in a superimposed manner. The network I/F 518 is an interface for connecting the electronic blackboard 50 to the network 70.

FIG. 23 is a schematic diagram of an example of the MFP 60. As illustrated in FIG. 23, the MFP 60 includes a CPU 611, a ROM 612, a RAM 613, an input unit 614, a network I/F 615, and an engine unit 616, which are connected with each other via a bus.

The CPU 611 reads a computer program stored in the ROM 612 or the like onto the RAM 613 to execute the computer program and comprehensively controls the operation of the MFP 60. The input unit 614 performs various kinds of input to the MFP 60 and is a touch panel, a key switch, or the like. The network I/F 615 is an interface for connecting the MFP 60 to the network 70.

The engine unit 616 is hardware that performs versatile information processing and processing other than communication for implementing a copy function, a scanner function, a fax function, and a printer function. The engine unit 616 includes a scanner (an image reading unit) that scans and reads an image of a document, a plotter (an image forming unit) that performs printing on a sheet material such as paper, and a fax unit that performs fax communication, for example.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

The invention claimed is:

1. A system, comprising:
a first output apparatus and a second output apparatus that are connected to an information processing apparatus via a network; and
processing circuitry configured to
generate a plurality of jobs that instruct execution of processing to exchange a first image output to the first output apparatus for a second image output to the second output apparatus based on an image exchange instruction received on a screen that receives user operations, and
instruct the first output apparatus and the second output apparatus to execute the processing to exchange the first image for the second image based on the jobs,
wherein, when an instruction to designate the first output apparatus and the second output apparatus and an instruction to start the processing to exchange the output images are received on the screen, the processing circuitry is further configured to refer to job information that associates at least data handled in processing executed by a job, a user who executed the processing, processing information of the processing, a date and time when the processing was executed, and a processing state of the processing with each other, identify the first image output to the first output apparatus and the second image output to the second output apparatus, and generate a first job that causes the second output apparatus to output the first image and a second job that causes the first output apparatus to output the second image, and instruct execution of the first job and execution of the second job;
the processing circuitry is further configured to transmit the first image to the second output apparatus in accordance with the first job and transmit the second image to the first output apparatus in accordance with the second job; and
the system further includes
an output device configured to output the received first image and second image in accordance with the first job and the second job.

2. The system according to claim 1, wherein
the screen includes a selection button that receives the processing to exchange the output images, and
when the instruction to start the processing to exchange the output images has been received with the selection button selected, the processing circuitry is further configured to generate the first job and the second job.

3. The system according to claim 1, wherein
the screen includes a selection button that receives processing to exchange the output images, and
when an instruction to start processing to output an image has been received without the selection selected, the processing circuitry is further configured to refer to the job information, identify the first image output to the first output apparatus, and generate the first job that causes the second output apparatus to output the first image,
the processing circuitry is further configured to instruct the execution of the first job,
the processing circuitry is further configured to transmit the first image to the second output apparatus in accordance with the first job, and
the output device outputs the received first image in accordance with the first job.

4. The system according to claim 1, wherein
when the second output apparatus is an electronic blackboard, the processing circuitry is further configured to refer to the job information and generate a third job that acquires a written combined image in which a written image is combined with the second image output to the second output apparatus, the first job that causes the second output apparatus to output the first image, and a fourth job that causes the first output apparatus to output the written combined image,
the processing circuitry is further configured to
instruct execution of the third job, execution of the fourth job, and the execution of the first job, acquire the written combined image in accordance with the third job, and transmit the written combined image to the first output apparatus in accordance with the fourth job and transmits the first image to the second output apparatus in accordance with the first job, and the output device outputs the received written combined image and first image in accordance with the fourth job and the first job.

5. The system according to claim 4, wherein
the processing circuitry is further configured to acquire the written combined image when there is any written image to the second image.

6. The system according to claim 4, further comprising a display controller configured to perform control to display an icon to select any of the written combined image and an original image indicating an output image before being combined with the written image on the screen when the second output apparatus is an electronic blackboard, wherein the processing circuitry is further configured to transmit the written combined image to the first output apparatus when the icon to select the written combined image is selected on the screen and transmit the original image to the first output apparatus when the icon to select the original image is selected on the screen.

7. The system according to claim 4, wherein
the processing circuitry is further configured to generate the third job, the first job, and the fourth job when an instruction to designate the second output apparatus is received on the screen.

8. The system according to claim 1, wherein
when an instruction to designate the first output apparatus or the second output apparatus and an instruction to cancel image output to the output apparatus are received on the screen, the processing circuitry is further configured to refer to the job information, generate a job that cancels the image output to the designated output apparatus, and instruct execution of the job, and the output device cancels the image output to the output apparatus in accordance with the job.

9. A system, comprising:
a first output apparatus and a second output apparatus that are connected to an information processing apparatus via a network;
processing circuitry configured to
generate a plurality of jobs that instruct execution of processing to exchange a first image output to the first output apparatus for a second image output to the second output apparatus based on an image exchange instruction received on a screen that receives user operations,
instruct the first output apparatus and the second output apparatus to execute the processing to exchange the first image for the second image based on the jobs, and
receive designation of an image to be output to the first output apparatus or the second output apparatus on the screen and transmit the image;
an image accumulation memory to receive the image and accumulate and store the image; and
a job information memory to store therein job information that associates at least data handled in processing executed by a job, a user who executed the processing, processing information of the processing, a date and time when the processing was executed, and a processing state of the processing with each other, wherein
the processing circuitry is further configured to generate a written combined image in which a written image is combined with an output image.

10. A method for processing information for a system that comprises a first output apparatus and a second output apparatus that are connected to an information processing apparatus via a network, the method comprising:
generating a plurality of jobs that instruct execution of processing to exchange a first image output to the first output apparatus for a second image output to the second output apparatus based on an image exchange instruction received on a screen that receives user operations; and
instructing the first output apparatus and the second output apparatus to execute the processing to exchange the first image for the second image based on the jobs,
wherein, when an instruction to designate the first output apparatus and the second output apparatus and an instruction to start the processing to exchange the output images are received on the screen,
in the generating, referring to job information that associates at least data handled in processing executed by a job, a user who executed the processing, processing information of the processing, a date and time when the processing was executed, and a processing state of the processing with each other, and identifying the first image output to the first output apparatus and the second image output to the second output apparatus, and then generating a first job that causes the second output apparatus to output the first image and a second job that causes the first output apparatus to output the second image, and
in the instructing, instructing execution of the first job and execution of the second job,
the method further comprising:
transmitting the first image to the second output apparatus in accordance with the first job and transmitting the second image to the first output apparatus in accordance with the second job; and
outputting the received first image and second image in accordance with the first job and the second job.

11. The method according to claim 10, wherein
the screen includes a selection button that receives the processing to exchange the output images, and
when the instruction to start the processing to exchange the output images has been received with the selection button selected, the first job and the second job are generated.

12. The method according to claim 10, wherein
the screen includes a selection button that receives processing to exchange the output images, and
when an instruction to start processing to output an image has been received without the selection selected, in the generating, referring to the job information, and identifying the first image output to the first output apparatus, and then generating the first job that causes the second output apparatus to output the first image,
in the instructing, the execution of the first job is instructed,
in the transmitting, the first image is transmitted to the second output apparatus in accordance with the first job, and in the outputting, the received first image is output in accordance with the first job.

\* \* \* \* \*